United States Patent [19]

Naito

[11] Patent Number: 5,432,007
[45] Date of Patent: Jul. 11, 1995

[54] SOLVENT-FREE ORGANOSILOXANE COMPOSITION AND ITS USE

[75] Inventor: Hiroyuki Naito, Tokyo, Japan

[73] Assignee: Shizu NAITO, Tokyo, Japan

[21] Appl. No.: 131,632

[22] Filed: Oct. 5, 1993

[30] Foreign Application Priority Data

Oct. 6, 1992 [JP] Japan .................. 4-267544

[51] Int. Cl.$^6$ ............................................. B32B 9/04
[52] U.S. Cl. ................................. 428/447; 528/8; 528/9; 528/15; 528/16; 528/18; 528/19; 528/25; 528/34; 427/387
[58] Field of Search ............ 528/8, 9, 19, 15, 16, 528/18, 25, 34; 428/447; 427/387

[56] References Cited

U.S. PATENT DOCUMENTS 5,292,799  3/1994  Naito et al. ..................... 528/25

FOREIGN PATENT DOCUMENTS 57-94057  6/1982  Japan .
60-51756  3/1985  Japan .
3-68676   3/1991  Japan .

*Primary Examiner*—Melvyn I. Marquis
*Attorney, Agent, or Firm*—Armstrong, Westerman, Hattori, McLeland & Naughton

[57] ABSTRACT

A solvent-free ternary organosiloxane composition is disclosed, which contains (A) liquid organopolysiloxane, (B) a cross-linking agent, and (C) a curing catalyst and, optionally, (D) a filler, said organopolysiloxane (A) being constituted by organosilicon group of X—Si (wherein X represents a hydrogen atom or a monovalent hydrocarbyl group) and functional side chain of OR (wherein R represents a hydrogen atom, a $C_1$–$C_5$ alkyl group or an acyl group), said cross-linking agent (B) being one or more organometallic compounds selected from the group consisting of an organoaluminum compound, an organoboron compound, an organosilicon compound, an organotitanium compound and an organozirconium compound having at least one functional group selected from the group consisting of an alkoxy group, an acyloxy group and an oxime group, and said curing catalyst (C) being a metal-containing organic compound, with the total contents of the metal elements of the ternary composition being 25% by weight to less than 40% by weight in terms of $MO_{y/2}$ (wherein M represents aluminum, boron, silicon, titanium or zirconium, and y represents a valency of the metal element). A shaped polymer composition, an adhesive polymer composition, a composite structure, a composite sheet and a building material using the solvent-free organosiloxane composition are also disclosed.

15 Claims, No Drawings

SOLVENT-FREE ORGANOSILOXANE COMPOSITION AND ITS USE

BACKGROUND OF THE INVENTION

This invention relates to a solvent-free organosiloxane composition containing liquid organopolysiloxane as a major component, and uses thereof. More particularly, it relates to a solvent-free organosiloxane composition which can form, when in contact with water or heat of up to 300° C., a polymer having polysiloxane bonds as a main chain and having a good flexibility, and which can be used for forming a film, fibers, a coating material, a binder, a composite structure or a building material and uses of the composition.

Solvents have so far been important for preparing coating compositions, generally accounting for 45 to 50% of such paint compositions. More than 50 kinds of solvents are illustrated as major solvents. In particular, organic solvents are important and indispensable for dissolving or dispersing film-forming materials to impart a proper fluidity, coating properties and film-forming properties. Thus, organic solvents have so far been inevitable for producing coating compositions.

However, organic solvents can be described as dangerous objects due to their high combustibility and capability to induce various troubles (e.g., anesthesia, troubles of the central nervous system and the autonomic nervous system, troubles of liver and kidney, and inflammation of skin or eye), thus requiring control and caution in handling.

The environment of the earth cannot afford the use of such combustible, dangerous organic solvents which induce human troubles in daily commodities. Thus, it has been eagerly desired to develop solvent-free coating compositions. Although aqueous emulsion coating compositions and powder coating compositions have been developed as solvent-free coating compositions, these coating compositions have failed to have sufficient coating properties.

In general, varnishes, coating compositions, adhesives, fibers, and the like are mainly based on organic resins. Recent living environmental regulations have required incombustible or fire retardant, pollution-free materials in many fields. Under such situations, the use of organic solvents which are dangerous and can cause environmental pollution has been brought into question. Hence, pollution-free materials involving no such problems have eagerly been desired.

In order to meet the requirement, siloxane compounds which have Si—O bonds resistant against heat or light and which have good weatherability and high heat resistance have widely been investigated, part of the investigation results having been put into practice. Typical examples of the results and remaining problems are described hereinafter mainly referring to coating compositions and coating materials.

As a popular example of applying organosiloxanes to coating compositions, there are illustrated zinc-rich coating compositions developed in World War II. These coating composition comprise a hydrolyzed product of tetraethoxysilane diluted with about the same amount of isopropyl alcohol and about two-fold amount of zinc powder. This type of compositions is being widely used as anti-corrosive paints capable of forming a coating film at ordinary temperature.

There have been developed coating compositions prepared by diluting, with an organic solvent, polymers of organosiloxane or modified organosiloxane or copolymers thereof with various organic compounds, together with or without other organic resins. Most of the conventionally developed techniques are based on the above-described compositions. For example, a technique of preparing a modified tetraalkoxysilane as a filming agent in the presence of the same or more amount of a solvent, and applying the composition to an object, followed by air-drying or hot-air drying to form a heat-resistnt, anti-corrosive coat is disclosed in, for example, Japanese Examined Patent Publication No. 63-28942, and a technique of diluting an organosiloxane with an organic solvent and forming a film using the composition at an ordinary temperature or uder heating is disclosed in, for example, Japanese Examined Patent Publication No. 63-58191.

There have been many examples of merely combining organic compounds (organic resins) and organosiloxanes to prepare coating materials or the like. Most of them require heating upon film formation. Typical example thereof is described in Japanese Examined Patent Publication No. 55-41274, etc. wherein tetraethoxysilane and methyltriethoxysilane are mixed with polyvinyl butyral butylated methylolmelamine, and an object coated by the mixture is heated to 130° C. to form a coat.

Many studies have been made on utilization of organosiloxane as filming agent of heat-resistant coat. Japanese Examined Patent Publication No. 63-35183 discloses one typical example thereof wherein a coating composition prepared by adding a slight amount of an aluminum chelate compound to 50–80% by weight of a heat-resistant inorganic material (e.g., aluminum phosphate, zinc molybdate, calcium carbonate, zinc silicate powder, etc.), and adding thereto 20 to 50% by weight of a modified silicone resin is applied to an object, followed by baking at 180° C. to form a heat-resistant coat.

As an example of utilizing pure organosiloxane, there is illustrated a technique of preparing a durable, stain-proof transparent film composed of organosiloxane, an organotin compound and a volatile dimethylpolysiloxane (Japanese Unexamined Patent Publication No. 3-68676).

A technique of using a keto-enol tautomer compound for stabilizing a curing catalyst of a metal-containing organic compound in the polymer-forming organosiloxane has also been disclosed. For example, Japanese Examined Patent Application No. 48-17859 discloses this technique with respect to a mixed system of a linear copolymer having carboxyl groups within the molecule, an aluminum alcoholate complex compound, and a solvent. As a similar technique, Japanese Unexamined Patent Application No. 1-129066 discloses to use a keto-enol tautomer compound together with a curing agent of chelate compound in a mixed system of a resin having isocyanato groups, hydroxyl groups, epoxy groups, carboxyl groups and/or amino groups partly reacted with alkoxysilane group or hydroxysilane group, an epoxy resin and an organic solvent.

Techniques of curing a one-pack type organosiloxane composition at an ordinary temperature are disclosed in U.S. Pat. Nos. 3,294,739, 3,647,917 and 4,111,890. However, these patents do not disclose a technique of limiting the content of metals such as silicon in the composition to a particular range to thereby solve the problem of inorganic hardness and fragility with respect to a cured product containing the metals in high content, impart good flexibility to the cured product, and improve adhesiveness to a substrate.

In addition, it has not been disclosed, either, to apply the cured product with improved flexibility not only to a coating composition but to a building material, a sheet, fibers or the like.

The inventors have formerly made an invention relating to a solvent-free organosiloxane composition which, when subjected to specific conditions, can be cured at an ordinary temperature or under heating to provide a product such as a coating material and a binder, and have filed the invention as Japase Patent Application Nos. 4-180127 and 4-36273.

This formerly filed invention is characterized in that the content of the total metal elements in the solvent-free organosiloxane composition is 40% by weight or more in terms of $MO_{y/2}$. As a result of further investigations, the inventors have found that an organosiloxane liquid composition of less than 40% by weight in the content of the total metal elements can solve the problem of the inorganic hardness and fragility with respect to the cured product containing metal elements in high total content, can impart good flexibility to the product, and can improve adhesiveness to a substrate or the like, thus having completed the present invention.

In this specification, a siloxane cured product containing, as a main chain, a polysiloxane bond formed by bringing the solvent-free organosiloxane liquid composition of the present invention into contact with water or heat of up to 300° C. is in some cases abbreviated as "siloxane polymer composition".

In addition, the contents of metal elements such as aluminum, boron, silicon, titanium, zirconium, zinc and cobalt are in some cases presented in terms of "$MO_{y/2}$ weight %".

The term "adhesively accompanying property" as used herein in the present specification means the property that, when the polymer material is applied to a substrate (e.g., a metal plate such as a steel plate; a cement product such as an asbestos plate; a wood; etc.) and is then exposed to natural environment conditions for a long time, the polymer can expand or contract to the expansion or contraction of the substrate, thus the adhesion therebetween being maintained.

Several words are defined as follows and will be described in detail in the specific description of the invention to be described hereinafter.

The term "siloxane polymer composition" is a general term for cured siloxane products constituting a shaped polymer composition, an adhesive polymer composition, a composite structure, a composite sheet and a building material.

The term "shaped polymer composition" means a shape-retaining polymer composition which is composed of a cured product of the organosiloxane liquid composition of the present invention alon and is shaped in a particular form such as a film, a thin plate, a sheet, fibers, a string, a mass, a sphere, a rectangular member, etc.

The term "adhesive polymer composition means a polymer composition which forms a coating film or a binder adhering to the surface of various substrates and can be used as, for example, a coating composition, a varnish, an undercoating composition, a protective coating material having some thickness, an adhesive, a binder, a joint mixture, an agent for binding aggregates, a cementing material, and an anchor-fixing material.

The term "composite structure" means a structure wherein a cured product of the organosiloxane liquid composition of the present invention functions to unify a reinforcing material in a various shape such as a honeycomb, a massive structure, a plate, a net, fibers, a cloth, etc, aggregates, moldings, or a shaped product.

The term "composite sheet" means a sheet wherein a cured product of the organosiloxane liquid composition of the present invention unifies with a base material in a form of a sheet, net, cloth or texture.

The term "building material" means a building material wherein a cured product of the organosiloxane liquid composition of the present invention is coated on the surface of a building material base such as a metal product (e.g., iron-made product), a concrete product, a ceramic or clay product, a product of a natural material such as wood or bamboo, a synthetic product, etc.

As has been seen with the above-described prior art, the application of the organopolysiloxane as a coating component has mostly begun with auxiliary addition to an organic compound-based coating composition containing an organic polymer or an organic resin having a main chain of C—C bonds and being excellent in filming properties, dilution properties with a solvent and drying properties after being coated for the purpose of improving the coating composition.

Hence, these conventional coating compositions inevitably contain the dangerous, trouble-causing organic solvents, and there have been seen no positive attempts to produce and commercialize solvent-free coating compositions mainly using organosiloxane, and an incombustible or fire retardant siloxane polymer composition such as a shaped polymer composition in a form of film or fiber and an adhesive polymer composition such as a coating material or an adhesive.

On the other hand, development of products having enhanced incombustibility or fire retardant properties and enhanced hardness due to high content of inorganic ingredients such as silicon. However, there have been completed no techniques of imparting good flexibility to a siloxane polymer composition and improving adhesively accompanying properties to a substrate by limiting the content of metal elements such as silicon.

The inventor has given attention to the following fundamental problems which conventional films, fibers, coating compositions, coating materials, binders, structures, sheets, building materials, etc. utilizing the above-described prior art polymers and to the fact that there have been no techniques which take into consideration protection of the environment of the earth and saving of energy and labor.

1) In the case of using an organic compound having C—C bonds as the main chain:
   (a) use of an organic solvent which is dangerous and harmful is inevitable;
   (b) the composition is quite susceptible to oxidation by heat or fire;
   (c) a poisonous and harmful gas is produced upon combustion;
   (d) the composition provides quite poor weatherability.
2) In the case of using a silicon compound having incombustible S—O bonds as the main chain:
   (a) the composition provides poor flexibility;
   (b) the composition provides poor alkali resistance due to its high reactivity with an alkali metal element;

(c) cured products containing Si—O— bonds formed due to hydraulic property contain many pores, thus the products lack water impermeability;

(d) the composition cannot be applied to a material composed of inorganic Si—O bonds since organic materials have no adhesion property to the inorganic surface.

In addition to the above-described problems, the inventor has given attention to the fact that, in the formerly made invention (Japanese Patent Application Nos. 4-180127 and 4-36273), only insufficient care was taken with respect to the adhesively expanding or contracting property to the expansion or contraction of the substrate.

SUMMARY OF THE INVENTION

As a result of intensive investigations on an organopolysiloxane composition applied to a substrate to be left under natural conditions for a long time utilizing the advantageous features of siloxane bond (Si—O bond) that (a) it has a strong atomic bond energy and is therefore resistant against heat or light, (b) it absorbs less light rays of ultraviolet ray region and has therefore excellent weatherability and (c) it permits easy rotation of bond due to its long atomic bond distance and low electron density and therefore provides a high flexibility, the inventors have found that a liquid composition of particular organosiloxane has the following characteristic features:

(1) A liquid composition constituted by a particular liquid organopolysiloxane, a cross-linking agent of organometallic compound and a curing catalyst can form a liquid coating composition without any solvent;

(2) Particularly, when the content of the total metal elements of the organosiloxane liquid composition is controlled within the range of from 25% by weight to less than 40% by weight, there can be formed a siloxane polymer composition which has sufficient heat resistance with no fragility and which exhibits good adhesively accompanying properties to the substrate for a long time.

(3) When a metal-containing organic compound is allowed to be present in the aforesaid particular organosiloxane liquid composition, it can form the above-described effective cured polymer product when brought into contact with heat or water due to moisture curing mechanism; and (4) When the above-described organosiloxane liquid composition contains B—O bonds, Ti—O bonds, Zr—O bonds, etc., the polymer having a main chain comprised of —Si—O— bonds can exhibit highly functional polymer performance that cannot be obtained by the prior art.

It is an object of the present invention to provide an organosiloxane liquid composition which does not require any solvent and is therefore friendly to the environment of the earth and which, when in contact with moisture, forms a heat-resistant, well durable, flexible siloxane polymer composition. The siloxane polymer composition can find application to a film, fibers, a coating material, a varnish, an adhesive, a composite structure, a composite sheet or a building material.

Other objects, features and advantages of the present invention will become apparent from the detailed description of the preferrdembodiments of the invention to follow.

With the above-described objects in mind, the inventor has made intensive investigations and has completed the present invention.

According to the present invention, there is provided a solvent-free ternary organosiloxane composition, which contains (A) liquid organopolysiloxane, (B) a cross-linking agent, and (C) a curing catalyst, said organopolysiloxane (A) being low molecular weight polysiloxane compound constituted by organosilicon group of X—Si wherein X represents a hydrogen atom or a monovalent hydrocarbyl group and functional side chain of OR wherein R represents a hydrogen atom or a $C_1$-$C_5$ alkyl group, said cross-linking agent (B) being one or more organometallic compounds having a monovalent organic group and at least one functional group selected from the group consisting of an alkoxy group, an acyloxy group and an oxime group, and said curing catalyst (C) being one or more metal-containing organic compounds, with the total contents of the metal elements of the ternary composition being from 25% by weight to less than 40% by weight in terms of $MO_{y/2}$ wherein M represents a metal element, and y represents a valency of the metal element.

The present invention further provides the solvent-free organosiloxane composition as described above, wherein said liquid organopolysiloxane (A) is a low molecular weight polysiloxane comprising one or more of the compounds represented by the following general formula (1):

wherein $R^1$ represents a hydrogen atom or a $C_1$ to $C_5$ alkyl group, $R^2$ to $R^6$, which may be the same or different, each represents a hydrogen atom, $OR^1$ or a monovalent hydrocarbyl group, and n represents a number smaller than 15, and having a silicon content of 50% by weight or more on the basis of $SiO_2$.

The present invention further provides the solvent-free organosiloxane composition as described above, wherein said cross-linking agent (B) includes one or more organometallic compounds represented by the following general formula (2) or (3):

wherein T represents aluminum or boron, Q represents silicon, titanium or zirconium, $R^1$ represents a hydrogen atom or a $C_1$-$C_5$ alkyl group, $R^7$ represents a hydrogen atom, $OR^1$ or a monovalent hydrocarbyl group, p represents an integer of 0, 1 or 2, and m represents an integer of 0, 1, 2 or 3.

The present invention further provides the solvent-free organosiloxane composition as described above, wherein said cross-linking agent (B) includes an organotrialkoxysilane constituted by a monovalent organic group having at least an amino group.

The present invention further provides the solvent-free organosiloxane composition as described above, wherein said cross-linking agent (B) is mixed in an amount of up to 70% by weight based on said liquid organopolysiloxane (A).

The present invention further provides the solvent-free organosiloxane composition as described above, wherein said liquid organopolysiloxane (A), said cross-linking agent (B) or a mixture thereof contains dissolved therein a solid silicone resin having functional side chain of OR group wherein R represents a hydrogen atom or a $C_1$–$C_5$ alkyl group in an amount of up to 70% by weight.

The present invention further provides the solvent-free organosiloxane composition as described above, wherein said liquid organopolysiloxane (A), said cross-linking agent (B) or a mixture thereof contains dissolved therein a thermoplastic resin of linear organic high molecular compound having acyl groups in an amount of up to 30% by weight.

The present invention further provides the solvent-free organosiloxane composition as described above, wherein said liquid organopolysiloxane (A), said cross-linking agent (B) or a mixture thereof has been compounded with 1 to 500 parts by weight of a filler (D) of one or more members selected from the group consisting of an activating agent, a filler, a pigment and a colorant per 100 parts by weight of said liquid organopolysiloxane (A), said cross-linking agent (B) or a mixture thereof.

The present invention further provides the solvent-free organosiloxane composition as described above, wherein said activating agent is a powder of one or more of a boric acid-containing compound, a chromic acid-containing compound and a phosphoric acid-containing compound.

The present invention further provides the solvent-free organosiloxane composition as described above, wherein said curing catalyst (C) is one or more of metal-containing organic compounds, with the metal being zinc, cobalt, aluminum, titanium, zirconium or tin.

The present invention further provides the solvent-free organosiloxane composition as described above, wherein said curing catalyst (C) is in a blocked form of being unable to catalyze the reaction, with the blocking being attained with at least one keto-enol tautomer compound selected from the group consisting of alkyl group- or trifluoro group-containing β-keto-acid esters, β-diketone compounds and malonic esters in an amount of up to 50% by weight.

The present invention further provides the solvent-free organosiloxane composition as described above, wherein said curing catalyst (C) is retarded with one or more alcohols selected from the group consisting of monohydric alcohols and polyhydric alcohols in an amount of 50% by weight or less than that to thereby retard the catalytic reaction.

The present invention further provides the solvent-free organosiloxane composition as described above, wherein said curing catalyst (C) is contained in an amount of up to 10% by weight based on said liquid organopolysiloxane (A).

The present invention further provides the solvent-free organosiloxane composition as described above, wherein one or more of said liquid organopolysiloxane (A), cross-linking agent (B), silicone resin, thermoplastic resin and filler (D) have been subjected, independently or in combination, to heating to a temperature of up to 100° C. in the absence of water to thereby remove contained water or silanol groups, and then combined with said curing catalyst (C).

The present invention further provides a shaped polymer composition of siloxane cured product, which is formed by bringing into contact with water or heat of up to 300° C. the solvent-free organosiloxane composition described in one of claims 1 to 14, to thereby form a main chain of polysiloxane bonds.

The present invention further provides an adhesive polymer composition in a form of coating or binder, which is formed by bringing into contact with water or heat of up to 300° C. the solvent-free organosiloxane composition described in one of claims 1 to 14, to thereby form a main chain of polysiloxane bonds.

The present invention further provides a composite structure which is formed by bringing into contact with water or heat of up to 300° C. a mixture of 100 parts by weight of the solvent-free organosiloxane composition described in one of claims 1 to 14 and 1 to 2,000 parts by weight of one or more of reinforcing materials, aggregates and moldings, to thereby produce a composite polymer containing as main chain polysiloxane bonds.

The present invention further provides a composite sheet which is formed by applying the solvent-free organosiloxane composition described in one of claims 1 to 14 to a cloth- or net-like base material to impregnate, then bringing the impregnated base material into contact with water or heat of up to 300° C., to thereby produce a composite polymer wherein the cured polymer containing as main chain polysiloxane bonds is unified with the base material.

The present invention further provides a building material which is formed by coating the solvent-free organosiloxane composition described in one of claims 1 to 14 to a plate-shaped or particularly shaped building material base, then bringing the coated base material into contact with water or heat of up to 300° C., to thereby produce a coating material formed of the cured polymer containing as main chain polysiloxane bonds.

DETAILED DESCRIPTION OF THE PREFERRED

EMBODIMENTS OF THE INVENTION

An important feature of the present invention is that a liquid composition in a harmful solvent-free state, which contains as an organopolysiloxane as a major component and which enables easy coating work, is provided as a starting material for a siloxane polymer composition, and that a cured product of the siloxane polymer composition exhibits various effective properties.

In order to impart incombustible or fire-retardant, heat-resistant properties to the cured siloxane polymer composition, it is necessary to exclude a combustible solvent, decrease the content of heat-susceptible organic component and increase the content of metals, particularly silicon. On the other hand, if the content of metals is too much, the cured siloxane polymer composition tends to exhibit inorganic properties such as high hardness, high breakability, low toughness and high fragility as can be seen with glasses or porcelain, thus the objects of the present invention to attain high flexibility and adhesively expanding or contracting properties to a substrate not being obtained.

In developing a siloxane polymer composition having high flexibility, high adhesively conformable propeerties, and high heat resistance, it is necessary to reduce the inorganic properties. The inventors have made intensive investigations to develop a material which shows excellent inorgnic features such as high incombustibility or fire retardant properties and excellent heat-resistance and yet shows excellent organic features such as good flexibility and adhesively expanding or contracting properties. As a result, it has been found that the specific mixed ternary liquid composition which comprises a liquid organopolysiloxane (A) having a polymerization degree of a specific range and a silicon content of a definite degree and having monovalent hydrocarbyl groups as the organic groups of the organosilicon moieties and hydrogen atoms or alkoxy groups as the functional groups, a similarly specified cross-linking agent (B) and a curing catalyst (C) can form a siloxane polymer which shows less hardness and less fragility than general inorganic materials, shows enough adhesiveness to effectively follow expansion or contraction of a substrate occuring during long-time exposure to natural conditions, and yet maintains high incombustibility or fire retardant properties and high heat resistance in comparison with polymer products made of general organic resins when the content of metal elements presented in terms of $MO_{y/2}$ is controlled to be in the range of from 25% by weight to less than 40% by weight.

The silicon content of, for example, methyltrimethoxysilane $[CH_3Si(OCH_3)_3]$ having the least carbon number of organosiloxanes containing both organosilicon group and functional group OR bound to Si—O bond is 20.6% by weight when calculated as Si and 44.1% by weight when calculated as $SiO_2$. With ethyltriethoxysilane $[C_2H_5Si(OC_2H_5)_3]$ having more carbon atoms per group has a silicon component content of 14.6% by weight in terms of Si and 31.2% by weight in terms of $SiO_2$. Thus, it can easily be understood that, as the number of the carbon atoms of $R^1$ to $R_6$ of the organosiloxanes (A) of the foregoing general formula (1) increases, the proportion of the organic component increases while the silicon content decreases.

In order to increase the silicon content of organopolysiloxane to 50% by weight or more, preferably 53% by weight or more, in terms of $SiO_2$, it is necessary to polymerize organosiloxane to the degree of oligomer or more than that to thereby decrease the content of organic group, i.e., to prepare organosiloxane represented by the foregoing general formula (1) wherein n of $[-Si-O-]_n$ is at least two. For example, a dimer obtained by subjecting 2 mols of the methyltrimethoxysilane having a $SiO_2$ content of 44.1% by weight to condensation reaction with methyl alcohol being eliminated, has a silicon content of 24.7% by weight in terms of Si and 53.0% by weight in terms of $SiO_2$. Thus, it is seen that condensation reaction yields a product having an increased silicon content.

On the other hand, if n becomes too large, liquid viscosity of the organosiloxane increases so much that it becomes difficult to ensure good workability as a coating composition without a diluent such as an organic solvent. Since, the present invention intends to use a material and a method which are friendly to the environment of the earth, use of organic solvents causing various troubles must be avoided. Therefore, there is naturally an upper limit as to the silicon content or the polymerization degree to ensure a good liquid state and a good workability.

An important feature of the liquid organosiloxane (A) of the present invention is that organic groups are directly bound to silicon atoms not through oxygen atom as is different from inorganic polymer containing siloxane bonds. In particular, it is important for the organosiloxane to have sufficient sized organic groups (e.g., an alkyl group, a phenyl group, a glycidoxy group, a methacryloxy group, an aminoalkyl group, etc.) to protect the siloxane bonds for the purpose of effectively exhibiting good flexibility, water-repelling properties, water impermeability and alkali resistance which inorganic siloxane polymers do not possess. As the organic group, an alkyl group and a phenyl group are particularly preferred.

Considering that conventional inorganic and organic compounds having Si—O bonds have a poor alkali resistance, it is quite surprizing that the cured polymer products in accordance with the present invention show excellent alkali resistance as will be demonstrated by Examples to be described hereinafter even though it mainly contains —Si—O bonds.

Reasons for this excellent alkali resistance are not clear but may be presumed as follows. That is, as has been described hereinbefore, (1) the polymeric cured product of the present invention has a dense, strong network structure formed by the specific cross-linking reaction, and (2) Si—O bond has an average area of about 2.2 $nm^2$, whereas —$CH_3$ bond, for example, has an average area of about 1.2 $nm^2$, thus two —$CH_3$ bonds at the least fully covering and protecting one Si—O bond. Therefore, the polymeric cured product of the present invention presumably exhibits an excellent alkali resistance.

It is of importance that Si—O bonds of the liquid organopolysiloxane forming a skeleton of the polymeric cured product of the present invention are to some extent in the form of —Si—O—Si— bonds, which serves to enhance $SiO_2$ content and expect structure and properties of the resulting polymeric cured product.

In addition, when it is intended to complete formation of a siloxane cured product in a shorter time, it is effective to employ as a starting material a polymer having undergone the condensation reaction to some extent, or an oligomer or low molecular weight liquid polymer represented by the foregoing general formula (1) wherein n represents 2 or more.

Formation of a useful polymer from the siloxane liquid composition of the present invention at a temperature of from an ordinary temperature to 300° C. can be attained by properly selecting and controlling kinds of the liquid organopolysiloxane and organometallic compound (cross-linking agent), particularly formulation and kind of organosilicon group, hydroxyl group and alkoxy group, content of silicon, polymerization degree, preliminary step of removing moisture, catalytic power of metal-containing organic compound, etc.

In addition, it is necessary for the formed polymer to have a dense, strong, three-dimensional network structure for obtaining cured products with good and useful properties. However, a cross-linking agent having only two or less functional groups yields only a linear polymer or causes polymerization only at the terminal functional group of the polymer, thus failing to form an effective, three-dimansional network polymer. In order to form a dense, tough, three-dimensional polymer, it is necessary to use a cross-linking agent having at least three functional groups and cause the cross-linking reaction at many intermediate sites of the matrix polymer to form a three-dimensional structure wherein polymer chains extend in all directions.

Accordingly, the cross-linking agent performs important functions in completing the present invention. As such cross-linking agents, organometallic compounds having functional groups of —OR and represented by the general formula (2) of $[R^7{}_pN(OR^1)_{3-p}]$ or the general formula (3) of $[R^7{}_mQ(OR^1)_{4-m}]$ wherein N represents a trivalent aluminum or boron, Q represents a tetravalent silicon, titanium or zirconium, $R^1$ represents a hydrogen atom or a $C_1$–$C_5$ alkyl group, $R^7$ represents a hydrogen atom, a group of $OR^1$ or a monovalent hydrocarbyl group, p represents an integer of 1 or 2, and m represents an integer of 1,2 or 3 are fund to be effective.

Further, the inventor has found that, when a cross-linking agent (B) of the present invention has an amino group as the monovalent hydrocarbyl group, the basic amino group causes a neutralization reaction with the acidic curing catalyst to generate heat which in turn serves to accelerate the dealcoholation reaction necessary for the condensation polymerization. Therefore, such cross-linking agents having an aminoalkyl group are particularly effective where the polycondensation reaction is required to be completed in a short time for quickly attaining the desired polymer properties.

It is an important feature of the cross-linking agent (B) of the present invention that aluminum, boron, silicon, titanium or zirconium in the organometallic compound is directly bound to Si—O bond constituting a cured polymer to be formed, thus performing functions as a constituent member of the resulting polymer. Partial presence of these trivalent or tetravalent metal elements having sizes different from that of silicon in the main polymer chains of Si—O bonds serves to change the structure of the cured product from a completely regular structure to a partially irregular structure, which imparts an effective space to the structure of cured product. This space gives the cured product an enough toughness.

It is another important feature of the cross-linking agent (B) of the present invention that, as will be described in more detail hereinafter, the cross-linking agent (B) of organometallic compound containing aluminum, boron, titanium or zirconium functions both as a cross-linking agent and as a curing catalyst. Therefore, selection of the cross-linking agent (B) must be made in full consideration of the kind and amount of the curing catalyst (C) to be described hereinafter.

A fundamental difference lying between the organosiloxane composition of the present invention and the inorganic siloxane composition such as water glass is that the organosiloxane composition does not have any alkali metal components. In addition, alkyl groups or the like having participated in the condensation reaction are eliminated from the siloxane bonds as alcohols and vaporize away from the cured system. As a result, troubles caused by the remaining alkali components with the inorganic siloxane composition can be avoided. In addition, the electron density around Si—O bonds of organosiloxane composition is less than that of the inorganic composition, and Si—O bonds in the former have higher freeness and therefore higher flexibility. Thus, the curred polymer product of the present invention has a higher flexibility and can follow bending movement of the substrate to which the cured product is applied.

The inventor has further found that a composition obtained by dissolving a solid silicone resin in the above-described liquid organosiloxane can be preferably used as a coatiing composition or a binder. The term "solid silicone resin" as used herein means a paste-, flake-, gel- or powder-like, non-fluid silicone resin. In this case, the liquid viscosity of a resulting composition can be adjusted in an increasing direction in view of workability by incorporating the silicone resin already having a high molecular weight in a specific amount, and a structure of the resulting polymeric cured product and characteristic properties can be previously designed.

The inventor has further found that a liquid composition containing dissolved therein a thermoplastic resin composed of a linear organic polymer compound soluble in the liquid organosiloxane in an amount of up to 30% by weight is also favorably used as a composite liquid composition. Addition of the organic polymer compound leads to a decrease in concentration of the metallic elements, with incombustible or fire retardant properties tending to deteriorate. However, in the case where good coating and adhesive properties onto an organis substrate are required, the thermoplastic resin serves to improve adhesion to the substrate.

Additionally, as other means for increasing the silicon content in the polymeric cured product of organosiloxane, it may be considered to add, to the starting organosiloxane, colloidal or fnely powdered solid silica or silicate to obtain a composite composition. In this case, however, silica or silicate added to the organosiloxane cannot be expected to react with the organosiloxane to form one compound and constitute part of the siloxane bonds of the polymer to be formed. That is, silica or silicate forms only a mixture, and cannot be expected to show enough improved incombustible or fire-retardant properties and heat resistance to retain shape of the composition unless a cured polymer matrix itself has sufficient incmbustible or fire-retardant properties.

Further, the solvent-free liquid composition of the present invention may previously be compounded with a filler (D) such as an activating agent, a filler, a pigment or a colorant generally known in the art and selected for a particular purpose in a proper amount in accordance with its end-use. The filler (D) may have a particle size of up to 200 microns, preferably up to 100 microns.

As the curing catalyst (C) for accelerating the above-described cross-linking reaction, metal-containing organic compounds containing a metal such as zinc, cobalt, aluminum or tin are effective. In the present invention, the cross-linking agent (B) of organometallic compound also functions as a curing catalyst as well as a cross-linking agent. Therefore, as is described above, the amount of curing catalyst (C) must be decided in consideration of this point.

The inventor has searched blocking agents which can previously block the curing catalyst (C) so as to ensure stable storage of one-pack type composition and enable one to control progress of the curing reaction after application of the composition, and has found that keto-enol type tautomer compounds and alcohols can be effectively used as such blocking agents.

In general, keto-enol type tautomer compounds have the property of being in an equilibrium state between keto form (ethyl $\beta$-ketobutyrate) and enol form (ethyl $\beta$-hydroxycrotonate). The keto-enol type tautomer compounds seem to exhibit the blocking effect since they undergo chelation based on intramolecular hydrogen bond and difficultly form intermolecular hydrogen bond and scarcely cause intermolecular association.

Keto-enol tautomer compounds in an enol form are considered stable due to chelation by a hydrogen bond. In the presence of a compound having hydroxyl group such as water, alcohol or acetic acid, this hydroxyl group is liable to form a hydrogen bond with the oxygen atom of the keto type carbonyl group, thus chelation of the metal element being inhibited and the metal element initiating the catalytic function.

In the present invention, it is also effective to compound a monohydric or polyhydric alcohol in order to delay the curing reaction rate. Though reasons for this fact are not clear, it has been found that the coexistent alcohols depress the progress of the dealcoholation reaction to thereby delay the reaction rate.

An important advantage of the liquid composition of the present invention is that it can be stored in a one-pack state even in the copresence of a curing catalyst. The liquid composition of the present invention may of course be in a two-pack form but, from the viewpoint of ease in application, a one-pack type is desirable. In order to permit one-pack form, R of the group OR in the starting liquid organosiloxane must be organic groups such as alkoxy group and acyloxy group which can stably exist even in the presence of a curing catalyst.

If R of the group OR in the starting liquid organopolysiloxane includes hydrogen atom, or if the organosiloxane has so-called silanol groups, the OH group of the silanol group causes condensation reaction with coexistent alkoxy groups or the like to eliminate alcohol in the presence of a curing catalyst even in the absence of water, thus the raw liquid composition being polymerized. As a result, such composition cannot be stored in a one-pack form and requires difficult quality control.

Therefore, a composite organosiloxane liquid composition containing a filler (D) such as a colorant or a pigment and containing water or silanol groups must be subjected to a preliminary treatment for removing water or silanol groups in order to avoid progress of the curing reaction during storage.

In the preliminary treatment, the prepared organosiloxane liquid composition or the composite composition is left at a temperature of up to 100° C. to cause reaction between the contained water or silanol groups and coexistent alkoxy groups. This preliminary treatment facilitates the procedure of dispersing a filler such as a colorant or a pigment in the organosiloxane liquid composition in an open stete, which has so far been difficult.

As has been described hereinbefore, the liquid composition of the present invention initiates the condensation reaction when exposed to the atmosphere to form a siloxane polymer cured product. The reaction may sufficiently proceed at an ordinary temperature but, when heat of up to 300° C., preferably up to 270° C., is applied thereto, formation of the siloxane polymer composition can be completed in a shorter time due to acceleration of the dealcoholation reaction. Therefore, in enhancing productivity under limited physical and periodical conditions of production lines in a factory, a curing procedure under heating is particularly effective.

The solvent-free organosiloxane liquid composition can find the following applications when cured in the presence of moisture at an ordinary temperature or up to 300° C. together with or without other materials.

(1) A shaped polymer composition in a form of a film, thin sheet, fibers, strand, mass, sphere, square bar or other specific form, formed without other materials.

(2) An adhesive polymer composition to be applied to the surface or interior of various substrates such as a coating or varnish, a protective coating having some thickness, an adhesive, a binder, a joint mixture, amassing or unifying agent for various aggregates, a cementing material, and an anchor-fixing material.

(3) A composite structure unified with a reinforcing material with a form of honeycomb, mass, plate, net, fiber or cloth or with aggregates, moldings or structural products.

(4) A composite sheet unified with a sheet base with a form of film, net, cloth or texture.

(5) A building material formed by applying the siloxane composition to the surface of a building material base such as a metal product (e.g., an iron-made product), a concrete product, a ceramic or clay product, an enamel product, a prduct of a natural material such as wood or bamboo or a synthetic product thereof.

The liquid organopolysiloxane (A) is a base matrix of the cured polymeric product of the present invention. Therefore, the content of liquid organopolysiloxane (A) is important with respect to workability of the composition and properties of a resulting cured product.

X in the organopolysilicon group (X—Si) of the liquid organopolysiloxane to be used in the present invention is a hydrogen atom or a monovalent hydrocarbyl group having 1 to 5 carbon atoms, and is preferably a straight or branched alkyl group, a fluoroalkyl group, a vinyl group, an allyl group, an alkenyl group, a phenyl group, a xenyl group, a naphthyl group, an aryl group, a cyclohexyl group, a cyclohexenyl group, a benzyl group, an aralkyl group, an epoxy group, an aminoalkyl group, etc.

When the liquid organopolysiloxane (A) having the above-described organosilicon group has a silicon content as high as possible and the content of the total metal elements of the liquid composition of the present invention is controlled at a level of 25% by weight to less than 40% by weight in terms of metal oxide, the liquid composition shows good liquid state providing easy workability, and there results a polymeric cured product having intended properties, particularly good flexibility, good adhesively following properties, good water-repelling properties, good alkali resistance and good water impermeability. As the group X, an alkyl group (e.g., methyl or ethyl) and a phenyl group are particularly effective.

On the other hand, the functional side chain of OR in the liquid organopolysiloxane (A) is important as a site from which the polymerization reaction initiates in the presence of moisture. Therefore, this OR group must be a functional group which can be hydrolyzed to form a silanol group or which can accelerate the polymerization reaction with OH of siloxane in the copresence of a curing catalyst. For this purpose, R in the OR group is preferably a monovalent alkyl group of $C_nH_{2n+1}$, and therefore the OR group is preferably an alkoxy group.

In order to impart enough incombustibility or fire retardance to the siloxane polymer of the present invention, it is necessary to adjust the content of silicon of the organopolysiloxane (A) to a level as high as 50% by weight or more in terms of $SiO_2$. This can be attained by selecting, as liquid organopolysiloxane (A), an oligomer or polymer represented by the general formula (1) wherein n of [—Si—O—]$_n$ moiety is a number of 2 or more.

However, n in the foregoing general formula (1) is preferably less than 15. Organopolysiloxanes of such polymerization degree provide a viscosity of not more than 3,000 cps which serves to ensure easy handling of the composition and which eliminates the necessity of dilution with a diluent such as an organic solvent. This technique contributes to provision of the solvent-free organosiloxane composition.

In order to design a cured polymer product having a skeleton adapted to a particular end-use, it is advantageous to select a liquid organopolysiloxane having a some polymerization degree and having functional side chain of OR, as the organopolysiloxane (A).

As such organopolysiloxane, that which is constituted by D units having two functional groups or T units having three functional groups or by a combination thereof, and which is a polymer wherein n of the moiety of [—Si—O—]$_n$ is at least 2 is suitable. The upper limit of n may be increased to such degree that the polymer is still in a liquid state. As a general guide, low molecular polysiloxane compounds having a molecular weight of the order of $10^2$ to $10^5$ are preferred.

As to organic side chains (R) including OR of the functional side chain of liquid organopolysiloxane (A), the ratio of R/Si (wherein Si represents Si—O bond) is preferably in the range of from $\frac{1}{3}$ to 2/2 from the standpoint of keeping SiO$_2$ content at a high level and allowing the polymerization reaction to effectively proceed to form an intended cured polymer product.

As typical examples of liquid organopolysiloxane (A) favorably used in the present invention, there may be illustrated methylmethoxysiloxane oligomers, organopolysiloxanes of $\frac{1}{3}$ to 2/2 in R/Si ratio having alkyl groups, fluoroalkyl groups, vinyl group, allyl group, alkenyl groups, phenyl group, xenyl group, naphthyl group, aryl groups, cyclohexyl group, cyclohexenyl group, benzyl group, aralkyl groups, epoxy groups, aminoalkyl groups, etc. and, particularly, organopolysiloxanes having methyl or phenyl group, tetramethyl- or ethyl-orthosilicate oligomers, methyl- or vinyltriacetoxysilane oligomers, and the like. These compounds may be used alone or in combination of two or more.

In order to complete a flexible, dense, tough three-dimensional network structure from the liquid organosiloxane composition, it is necessary to form a cross-linkage between intermediate sites of polysiloxane molecules as well as linkage at terminus of polysiloxane molecules. A cross-linking agent (B) which functions to form such a cross-linkage in all directions is necessary for this purpose. As such cross-linking agent (B), a liquid organic compound of aluminum or boron having the functional group of OR which can react with the silanol group and being represented by the general formula (2) of $[R^7{}_pT.(OR^1)_{3-p}]$ or a liquid organic compound of silicon, titanium or zirconium having the functional group of OR which can react with the silanol group and being represented by the general formula (3) of $[R^7{}_mQ.(OR^1)_{4-m}]$ are effective. In addition, those wherein $R^7$ has a large number of carbon atoms are preferred to obtain good flexibility and and good adhesively following properties.

Typical examples of the cross-linking agent (B) are shown below.

As examples of the cross-linking agent represented by the general formula (2) wherein T represents an aluminum element, those organometallic compounds wherein p represents 0 and $R^1$ represents an isopropyl group or a sec-butyl group are preferred. When T represents a boron element, those organometallic compounds wherein p represents 0 and $R^7$ represents a methyl group, an ethyl group or a butyl group are preferred.

When Q in the general formula (3) represents a silicon element, those organometallic compounds wherein $R^7$ represents a methoxy group or an ethoxy group, such as tetramethylorthosilicate, tetraethylorthosilicate, methyltrimethoxysilane, methyltriethoxysilane, vinyltriacetoxysilane, vinyltrimethoxysilane, phenyltrimethoxysilane, γ-glycidoxypropylmethoxysilane, dimethylmethyltrifluoropropylsilane, γ-methacryloxypropyltrimethoxysilane, γ-methacryloxypropylmethyldimethoxysilane, -ureidopropyltriethoxysilane and γ-(2-aminoethyl)aminopropyltriethoxysilane are preferred.

When Q in the general formula (3) represents a titanium element, such organometallic compounds as tetra-i-propyltitanate, tetra-n-butyltitanate and are preferred and, when Q in the general formula (3) represents a zirconium element, such organometallic compounds as tetraethylzirconate, tetra-i-propylzirconate and tetra-n-butylzirconate, are preferred.

These organometallic compounds are preferably in the form of monomers in view of attaining sufficient cross-linking effect, but they may partly be in a polymerized form of dimer or the like. The organometallic compounds may be used alone or in combination of two or more according to the end-use and workability. The cross-linking agent (B) of the present invention is advantageously compounded in the composition in an amount of up to 70% by weight, preferably up to 65% by weight, based on the liquid organopolysiloxane (A) for attaining improved cross-linking effect in the siloxane polymer composition and high flexibility and high adhesively following properties of the siloxane polymer composition.

Since the cross-linking agent (B) is an organometallic compound, care must be taken to the fact that the cross-linking agent functions as a curing catalyst as well as a cross-linking agent. Therefore, the compounding amount of the organometallic compound, particularly, the aluminum-, boron-, titanium- or zirconium-containing organic compound, is desirably limited to up to 25% by weight based on the composition of the present invention, though it depends upon the kind and amount of the curing catalyst (C) of the present invention. The composition containing the cross-linking agent in such an amount shows good one-pack storage properties and sufficient curing rate and facilitates control of produced film properties.

In the present invention, a properly selected solid slicone resin may be added to the liquid organopolysiloxane of the present invention for the purpose of properly designing the fundamental skeleton of a produced siloxane polymer composition and adjusting viscosity of the liquid composition to control workability. In this case, however, it is important that the solid silicone resin be once dissolved in an organosiloxane liquid. The silicone resin is preferably compounded in an amount of up to 60% by weight in view of attaining the above-described objects and ensuring good workability. However, since such silicone resins generally cntain 3 to 8% by weight of a silanol group, the liquid composition of the present invention containing the silicone resin to be stored in a one-pack form must be subjected to the preliminary treatment described hereinbefore so as to block the silanol group.

Furthermore, the liquid organopolysiloxane composition of the present invention may contain dissolved therein a thermoplastic resin for the purpose of improving adhesion to an organic substrate or attaining minor modification as a coating composition. As the thermoplastic resin, linear organic high molecular compounds having acyl groups and being soluble in an organosiloxane are preferred. Examples thereof include resins such as an acrylic resin, a polystyrene resin, a polyethylene resin, a polyvinyl chloride resin, cellulose, etc. and derivatives thereof and copolymers with an unsaturated carboxylic acid produced in a non-aqueous solvent. Monomers include, for example, ethylene, propylene, butadiene, isoprene, chloroprene, styrene, vinyl acetate, vinyl propionate, vinyl ether, vinyl chloride, vinylidene chloride, methyl or ethyl acrylate and an acrylic ester, and the unsaturated carboxylic acid include, for example, acrylic acid, methacrylic acid, crotonici acid, itaconic acid and maleic anhydride.

These thermoplastic resins are preferably compounded in an amount of up to 30% by weight, preferably up to 25% by weight, for attaining the above-described objects and ensuring good workability.

In the organosiloxane composition of the present invention may be compounded a filler (D) selected from the grooup consisting of a powdery activating agent, filler, pigment or colorant having a size of up to 200 microns according to particular properties, functions, workability, end-use, etc. of the cured siloxane polymer composition. These fillers (D) may be compounded in amounts not spoiling the workability and properties of the organosiloxane composition. One or more of the fillers may be added in amounts of 1 to 500 parts by weight, preferably 1 to 400 parts by weight, per 100 parts by weight of the ternary composition containing organopolysiloxane as a major component. As to compounding stage, the fillers are preferably compounded before addition of the curing catalyst (C). When the fillers (D) contain moisture or OH groups, it is important to subject them to a treatment for removing the moisture or OH groups, such as a drying treatment or the preliminary treatment specified in the present invention. Examples of the fillers (D) are illustrated belw.

As the activating agents, powdery products of a boric acid-containing compound, a chromic acid-containing compound and a phosphoric acid-containing compound may be employed. The organosiloxane composition containing therein the activating agent tends to show an improved adhesive properties to, for example, a substrate of metal such as iron to expect good corrosion resistance. As the boric acid-containing compound, chromic acid-containing compound and phosphoric acid-containing compound, there may be used powders of borosilicate glass, zinc borate, boron phosphate, an alkaline earth metal salt of boric acid, an alkali metal salt of boric acid, zinc chromate, strontium chromate, lead chromate, silicon phosphate, aluminum phosphate, zinc phosphate, an alkaline earth metal salt of phosphoric acid, etc. or modified products thereof.

As the fillers, proper one may be selected from among powders of metals such as stainless steel, silicon, zinc, aluminum or iron or alloys thereof, glass powder, pottery powder, diamond powder, silicon oxide (e.g., siliceous sand powder, silica powder, fumed silica, etc.), powder of fused alumina, powder of magnesia, calcium carbonate, zircon sand, various clays (e.g., purified product of bentonite, smectite, kaolin, woody clay, etc.), baked clays (e.g., bauxite, montmorillonite, kaolin, etc.), gypsum, calcium phosphate, magnesium phosphate, barium sulfate, aluminum fluoride, calcium silicate, magnesium silicate, barium silicate, barium carbonate, barium hydroxide, aluminum silicate, glazing compositions having various formulations, and powders of up to 200 microns in size selected from powders of talc, mica or fly ash.

As the pigments, inorganic pigments such as titanium dioxide, red iron oxide, chromium oxide, chrome yellow, carbon black and ultramarine, baked pigments composed of metal, alloy or oxide, inorganic functional pigments such as silica white carbon, alumina, zinc oxide, magnetic iron oxide, boron nitride, silicon nitride and various clay powders, and organic pigments may be used depending upon the end-use.

As the colorants, the above-described inorganic pigments may also be used but, since the organosiloxane of the present invention has organic groups, organic pigments and dyes known and widely used in the art may be used alone or in combination to impart a desired hue to the cured polymer of the present invention.

The above-described fillers (D) may be used alone or in combination of two or more in full consideration of size distribution, shape, pore volume, specific surface area, water absorption capacity, oil absorption capacity, etc. suited for the particular end-use of the organosiloxane composition. Fillers of desired properties can be obtained by grinding, classification, mixing, baking, purification or like procedure. These fillers may have been surface-treated with a coupling agent or a surfactant depending upon desired workability and the end-use.

The curing catalyst (C) to be used in the present invention is preferably selected from the group consisting of organometallic compounds containing zinc, cobalt, aluminum or tin and mixtures thereof. Needless to say, care must be taken to the point that, as is described above, the cross-linking agent (B) of titanium- or zirconium-containing organic compound also functions as a curing catalyst. Specific examples of the metal-containing curing catalyst (C) are illustrated below. That is, known general curing catalysts such as zinc naphthenate, cobalt octate, cobalt naphthenate, aluminum trimethoxide, aluminum di- or tris(acetylacetonate), aluminum tri-n-butoxide, diacetyltin diacetate, dibutyltin dilaurate, dibutyltin diacetate, dioctyltin dilaurate, diacetyltin dioxtoate and tin octate may be used.

One of the important features of the present invention is that the curing catalyst (C) may be previously blocked by a keto-enol type tautomer compound to thereby ensure long storage stability of the composition of the present invention in a one-pack form, said composition comprising a ternary mixture solution of liquid organopolysiloxane (A), cross-linking agent (B) and curing catalyst (C).

The keto-enol tautomer compound is a compound which is in an equilibrium state between keto form and enol form as has been described hereinbefore, and which undergoes intramolecular chelation based on hydrogen bond. A typical example of the tautomer compound is ethyl acetoacetate, which is preferably used in the present invention. Other examples of the keto-enol tautomer compound include malonic acid diesters, β-diketones (e.g., acetylacetone), benzoylacetone, dibenzoylmethane, ketones having a hydroxyl group in β-position (e.g., diacetone alcohol), esters having a hydroxyl group at β-position (e.g., methyl salicylate), and derivatives of the above-described compound wherein said alkyl group is constituted by a trifluoro group.

The amount of the keto-enol tautomer compound varies depending upon the kind and amount of the curing catalyst (C) and during conditions, but can easily be determined by conducting simple experiments. As a general fuide, the tautomer compound is compounded in an amount of up to 50% by weight in the curing catalyst to obtain effective blocking effect.

Another important feature of the present invention is that the condensation reaction rate can be retarded by compounding a monohydric or polyhydric alcohol in the curing catalyst (C). This technique enables one to control the curing rate upon formation of the cured polymer.

Examples of the reaction-retarding alcohols include monohydric alcohols such as methyl alcohol, ethyl alcohol, propyl alcohol, butyl alcohol, amyl alcohol, etc. and polyhydric alcohols such as ethylene glycol, glycerin, erythritol, etc.

The amount of the alcohol to be used for retarding the condensation reaction varies depending upon the kind and amount of the curing catalyst (C), curing condition and degree of retarding the reaction, but can easily be determined by conducting simple examples. As a general guide, the alcohol is previously compounded in the curing catalyst (C) in an amount of up to 50% by weight for not spoiling the catalytic action of the curing agent. In the case of using the above-described blocking agent of keto-enol tautomer compound and the reaction-retarding agent of alcohol in combination, their total amount is preferably up to 50% by weight based on the curing catalyst (C).

The amount of the curing catalyst (C) blocked with the keto-enol tautomer compound, the amount of the curing catalyst (C) compounded with the reaction-retarding alcohol, or the amount of the curing catalyst (C) independently used varies depending upon content, kind and amount of the liquid organopolysiloxane (A) or the cross-linking agent (B) or upon content and kind of the curing catalyst. In general, however, the curing catalyst is used in an amount of 0.1 to 10.0% by weight. Particularly when an aluminum-, boron-, titanium- or zirconium-containing organometallic compound is used as the cross-linking agent (B), the amount of the curing catalyst (C) may be minimized. When the above-described compounding conditions are satisfied, the curing condensation reaction smoothly proceeds to produce the intended cured polymer product.

In the present invention, R of group OR in the organopolysiloxane (A) may be a hydrogen atom. As has been described hereinbefore, however, it is necessary, when the hydrogen atom constitutes a silanol group (OH group), the organopolysiloxane must previously be subjected to the preliminary treatment together with the cross-linking agent (B) so as to ensure one-pack storage stability of the liquid composition. Employment of the preliminary treatment is also important in the case of using a silicone resin, a thermoplastic resin or a filler (D) in combination.

The preliminary treatment is completed by maintaining the liquid organopolysiloxane (A), thermoplastic resin or filler (D) alone or in combination at a temperature of ordinary temperature to up to 100° C. for at least 5 minutes, preferably at least 8 minutes in the absence of water under stirring or being left to stand. In the case of employing an ordinary temperature, 24-hour treatment is sufficient. This treatment causes dealcoholation reaction between silanol group and alkoxy or acyloxy group to remove the silanol groups. A filler (D) having a large amount of water is preferably subjected to a dehydrating treatment such as heating prior to the preliminary treatment.

The mixed or composite composition of the present invention comprising the liquid organopolysiloxane (A), cross-linking agent (B), curing catalyst (C) and, if necessary, filler (D) initiates the curing reaction when brought into contact with water. Moisture in the atmosphere is sufficient for the initiation of the reaction, but the composition may positively be brought into contact with water. To bring the composition into contact with water may be conducted at ordinary temperature or under heating up to 300° C., preferably up to 250° C. and under pressure or degassing conditions. If necessary, it may be conducted under reduced pressure or in an atmosphere of inert gas such as a nitrogen gas. In short, it suffices to leave the composition under such conditions that the functional OR group in the liquid composition is first hydrolyzed to produce OH of silanol group, and this silanol group in turn reacts with remaining functional OR group to produce siloxane bond with eliminating an alcohol.

When the mixed or composite composition of the present invention comprising the liquid organopolysiloxane (A), cross-linking agent (B), curing catalyst (C) and, if necessary, filler (D) is exposed to moisture-containing atmosphere by maintaining it in a specific shape, applying it to the surface of a substrate, impregnating it into a substrate or by unifying it with various materials, no harmful materials such as organic solvents are allowed to diffuse into the working environment, and when the cured polymer product is subjected to combustion, no harmful and poisonous gases are produced. Thus, the composition of the present invention can be safely used without polluting the environment of the earth.

The organosiloxane compositions of the present invention may previously be compounded with surfactants such as fluorine-containing ones, various organic compounds, resins and, if necessary, solvents in amounts not sacrificing the favorable properties and workability of the composition for the purpose of improving dispersibility, impregnation property, anti-foaming property, fluidity, coating property, etc.

Mixing of the organosiloxane mixed solution of the present invention with the above-described fillers must be conducted under moisture- or water-free condition. Otherwise, curing reaction of the organosiloxane composition might initiate. Thus, the mixing step must be conducted in a dry air or under reduced pressure. Alternatively, the fillers may be mixed with the organosiloxane before the curing catalyst is added thereto, then the resulting mixture is subjected to the preliminary step, and finally the curing catalyst (C) is added in a predetermined amount.

Mixing manner varies depending upon the contents or end-use of the organosiloxane composition, but may be conducted by properly selecting a mixer employed in civil engineering, cement industry, concrete industry, paint industry, food industry, chemicals-producing industry, etc., such as a mortar mixer, a stirrer, a mixer, a roll, a homogenizer or the like for obtaining a homogeneous, liquid, pasty or mortar-like mixture. Materials to be mixed (liquid or powdered form) may previously be cooled or heated before use in consideration of weather condition or environmental condition upon working, for example, in consideration of the season (summer or winter).

The solvent-free organopolysiloxane liquid composition of the present invention can be formed into a filament or film by exposing it, as such or after partial initiation of the moisture curing, to a thermal atmosphere of up to 300° C. for at least 60 seconds while maintaining it in a form of filament or film. As a preferred embodiment, the liquid composition is spread over the surface of water to form a thin film. This thin film can be taken upward in a filament form before it loses fluidity. A filament-shaped polymer composition can be recovered by passing the filament through a thermal atmosphere of up to 300° C. A film-shaped polymer composition can smilarly be recovered with ease by spreading the liquid composition over the surface of water.

The mortar-like, pasty or liquid organosiloxane composition thus prepared in a homogeneous state may be applied automatically or manually according to known methods generally employed in the art such as spray coating method, brushing method, roller coating method, trowel coating method, dip-coating method, pickup coating method, nozzle-coating method, rolling-up method, curtain coating method, casting method, piling method, patching method or the like to form a shaped composition, or may be subjected to coating work, protective coat-forming work, adhesion work, fixing work, unifying work, anchoring work or like work to form an adhesive polymer composition. In some end-uses, conditions or applying methods, it is of course possible to conduct wet-on-wet coating or double layer-coating wherein respective layers have different formulations.

When used as a kind of binder, the liquid organosiloxane composition of the present invention can provide a composite cured product or structure wherein aggregates, reinforcing agents or moldings are unified to obtain desired performances, functions, etc. adapted for a particular end-use.

As the aggregates, reinforcing agents or moldings, there may be used those which have a comparatively large size of 200 microns or more or which are selected from the following materials in amounts of not spoiling the workability and favorable properties of the composition, generally 100 to 2,000 parts by weight per 100 parts by weight of the organosiloxane composition.

As the aggregates having a particle size of 200 microns or more, there may be used, for example, various aggregates of silica stone, silica sand, agalmatolite, feldspar, chamotte, mullite, alumina, dolomite, magnesia, zirconia, calcia, zircon, carbon, graphite, carbides or nitrides, various micas, asbestos, flake-like metal powder, etc. Further, artificially manufactured glass beads, hollow glass fine particles, glass flake and metal flake, pearlite, various synthetic light-weight aggregates, and powdery or granular artificial aggregates produced from industrial waste such as slag or fly ash. Still further, wood, bamboo, vegetable fibers, flake-like or fibrous metals, inorganic fibers such as glass fibers, rock wool, natural mineral fibers or carbon fibers, and fibrous reinforcing matrials or moldings such as staple of organic fibers, texture, sliver, net, mat, woven fabric, nonwoven fabric, etc. may also be used. Yet further, honeycomb moldings formed by using the above-described aggregates or the like may also be employed.

The particle size distribution and shape of the above-described aggregates, reinforcing agents or moldings may properly be selected according to the end-use or required properties. For some working conditions or end-uses, they may be previously treated with a coupling agent, a surfactant, a resin or the like.

A composite cured product or structure may be produced from these aggregates, reinforcing agents or moldings by various methods using the organosiloxane composition of the present invention as a binder. For example, the aggregates, reinforcing materials or moldings are first mixed with the organosiloxane composition of the present invention, the resulting mixture is placed in a given chase or vessel, followed by curing the organosiloxane. Alternatively, the composition of the present invention is cast or impregnated into a chase or vessel in which the aggregates, reinforcing materials or moldings have been placed, followed by curing the organosiloxane to obtain a composite cured product. A proper method may be selected in consideration of the end-use or environmental conditions.

According to one aspect of the present invention, a composite sheet can be formed by applying the organosiloxane liquid composition of the present invention to a sheet base such as a film, net, cloth or texture made of various materials such as natural materials, synthetic materials, minerals, glasses or ceramics, and curing the composition.

According to another aspect of the present invention, building materials of various sizes can be produced by applying the organosiloxane composition of the present invention to the surface of various building material bases such as metal products made of, for example, iron, concrete products, products of wood, bamboo or other natural materials or synthetic products thereof.

As can be seen from the above descriptions, the composition of the present invention can be applied to various substrates relating to daily necessities, manufacturing industry, building or civil engineering industry and service industry. Examples thereof are shown below, which, however, are not limitative at all.

That is, the organosiloxane composition of the present invention may be applied to the surface of parts, various structures, various apparatus, flooring, walls, blocks, flue, chimney, furnace and attachments thereto, roads, tunnels, bridges, building materials, buildings, etc. constituted by paper or pulp, metal (e.g., iron), alloy (e.g., stainless steel), rock, glass, gypsum, ceramics, slag, asphalt, wood or fibers or to the surface of ingot or apparatus requiring lot marking, or may be used for unifying various fabrics, moldings, structures or honeycomb bodies.

The organopolysiloxane composition of the present invention is also advantageously usable as a material for repairing, undercoating, pre-treating, covering (a hole of), finishing, thickening or anti-slipping the above-described objects. The organosilane composition may be compounded with various ceramics, fibrous materials, grinding materials, abrasion-resistant materials or various inorganic compounds to produce composite materials meeting various requirements such as high water resistance, heat resistance, flame resistance, acid resistance, etc. The above-described mixture can be used in a kitchen, flue, drain, building of a chemical factory, a food factory, a plating factory, a spa, as a material for solidifying various materials, materials for processing objects, adhesives, and sealers.

Furthermore, the organosiloxane composition of the present invention is also advantageously usable as a solidifying material in cast molding, as a cast-repairing material for damaged refractory furnace members, damaged chimnies, damaged boilers, damaged structures, etc. or as a cast-solidifying material for treating irregularly shaped industrial waste such as radioactive waste discharged from nuclear power plants.

Still further, the organosiloxane composition of the present invention may be used as an anchoring material for such structures as a tank, tower, building, etc. or for apparatus, or as a cementing material to places where imbedding or plastic patching is required.

The present invention is now described in more detail by reference to the following examples which, however, are not to be construed as limiting the present invention in any way. Additionally, the starting liquid organopolysiloxane (A) is abbreviated as "OS-A", a binary mixture composition of the liquid organopolysiloxane (A) and the cross-linking agent (B) as "OS-AB", and the solvent-free organosiloxane composition as "OS liquid composition". % is by weight.

EXAMPLE 1

I Starting materials, formulation and preparation of the liquid composition of the present invention (OS liquid composition)

1) Starting siloxane materials of liquid organopolysiloxane (A) (OS-A) and silicon contents thereof ($SiO_2$%) are shown in Table 1.

TABLE 1

| Symbol | Compound Name | $SiO_2$ (%) | Manufacturer[a] and Trade Name |
|---|---|---|---|
| SL-MF1 | Methyl- and phenyl-containing low molecular silicone | 55.7 | TD: DC 3037 |
| SL-MF2 | Methyl- and phenyl-containing low molecular silicone | 54.5 | TD: DC 3074 |
| SL-MF3 | Methyl- and phenyl-containing low molecular silicone | 53.0 | TD: Trial sample |
| SL-F | Phenyl-containing low molecular silicone | 63.5 | SS: KR 217 |
| SL-M | Methyl-containing low molecular silicone | 66.3 | TD: SR 2402 |
| SL-MFR | Methyl- and phenyl-containing high molecular liquid silicone resin | 72.8 | TD: SR 2414 |
| SL-MD | Methyltriethoxysilane oligomer | 53.1 | TD: Trial sample |
| SL-MSO | Methyl silicate oligomer | 51.0 | TM: M-51 |
| SL-ESO | Ethyl silicate oligomer | 54.0 | TM: Trial sample |

[a]Manufacturer
TD: Toray Dow-Corning Silicone
SS: Shin-etsu Kagaku Kogyo
TM: Tama Kagaku Kogyo 2) Materials for cross-linking agent (B) and metal component content thereof ($MO_{y/2}$%) are shown in Table 2.

TABLE 2

| Symbol | Compound Name | $MO_{y/2}$ (%) | Manufacturer[b] and Trade Name |
|---|---|---|---|
| B-ASB | Aluminum tri-sec-butyrate | 20.7 | DC: ASB |
| B-TMB | Trimethoxy borate | 33.5 | KK: TMB |
| B-MTM | Methyltrimethoxysilane | 44.1 | SS: KBM 13 |
| B-MTE | Methyltriethoxysilane | 33.6 | SS: KBE 13 |
| B-THE | Hydroxypropyltriethoxysilane | 28.5 | TD: AY43-024 |
| B-DMDM | Dimethyldimethoxysilane | 49.9 | TD: AY43-004 |
| B-CPDM | Methacryloxypropylmethyldimethoxysilane | 29.5 | TD: AY43-060 |
| B-FTM | Phenyltrimethoxysilane | 30.2 | TD: AY43-040 |
| B-FTE | Diphenyldimethoxysilane | 24.6 | TD: AY43-047 |
| B-GTM | Glycidoxypropyltrimethoxysilane | 25.4 | TD: SH 6040 |
| B-APE | Aminopropyltriethoxysilane | 27.1 | SS: KBE903 |
| B-AUE | Ureidopropyltriethoxysilane | 22.7 | TD: AY43-031 |
| B-FFM | Trifluorotrimethoxysilane | 39.4 | TD: Trial sample |
| B-TBT | Tetra-n-butoxytitanium | 23.5 | NS: TBT |
| B-TPT | Tetra-i-propoxytitanium | 28.2 | NS: TPT |
| B-TBZ | Tetra-n-butoxyzirconium | 22.6 | NS: TBZ |

[b]Manufacturer
TM: Tama Kagaku Kogyo
SS: Shin-etsu Kagaku Gogyo
KK: Koriyama Kasei
NS: Nihon Soda
CM: Commercially available product
DC: Daihachi Kagaku
TD: Toray Dow-Corning Silicone 2) Formulation of mixture of two or more liquid organopolysiloxane (A) (OS-A), silicon component content ($SiO_2$%), and conditions of the preliminary step are tabulated in Table 2.

3) Solid silicone resins and thermoplastic resins are tabulated in Table 3 together with the silicon content ($SiO_2$%). Additionally, these resins are dissolved in a cross-linking agent (B) shown in Table 4, and then compounded with OS-A to prepare OS-AB. In this example, the solid silicone resins or the thermoplastic resins are dissolved in phenyltrimethoxysilane (B-FTM) in a concentration of 50% by weight to prepare liquid compositions (BSR-MF1, BSR-MF2, BHR-AC and BHR-PE), and the resulting compositions are then compounded with OS-A to prepare OS-AB.

TABLE 3

| Symbol | Name of Compound | $SiO_2$ (%) | Manufacturer[c] and Trade Name |
|---|---|---|---|
| SR-MF1 | Methyl- and phenyl-containing high molecular flake-like silicone resin | 51.4 | TD: SH 6018 |
| SR-MF2 | Methyl- and phenyl-containing high molecular powdery silicone resin | 55.6 | TD: DC6-2230 |
| HR-AC | Low molecular weight acrylic resin | 0 | MR: BR-101 |
| HR-PE | Low molecular weight polyester resin | 0 | MR: Trial sample |

[c]Manufacturer
TD: Toray Dow-Corning Silicone
MR: Mitsubishi Rayon

4) Formulations, $MO_{y/2}$ content (%), and preliminary treatment conditions of a binary mixture liquid composition (OS-AB) prepared from OS-A shown in Table 1, cross-linking agent (B), and a resin dissolved in phenyltrimethoxysilane in a concentration of 30% by weight are shown in Table 4. Formulations and the like of Comparative Examples (AB-11 and 12) are also shown therein. Additionally, in this Example, $MO_{y/2}$ content (%) of the total curing catalyst (including the blocking agent or the reaction-retarding agent) is less than 40% by weight, and the content of the catalyst is up to 10% by weight. Hence, $MO_{y/2}$ content (%) of the OS liquid composition is presented at the stage of OS-AB composition for convenience.

TABLE 4

| Sample No. of OS-AB | Formulation of OS-A Composition and Resin Content | wt % | Cross-linking Agent Content | wt % | $MO_{y/2}$ (%) | Preliminary Treatment °C. | hrs |
|---|---|---|---|---|---|---|---|
| AB-1 | SL-MF1 | 20 | B-FTM | 32 | 39.2 | 40 | 20 |
|  | SL-MF2 | 15 | B-CPDM | 10 |  |  |  |
|  | SL-MFR | 3 | B-GTM | 10 |  |  |  |
|  |  |  | B-TBT | 5 |  |  |  |
|  |  |  | B-TMB | 5 |  |  |  |
| AB-2 | SL-F | 5 | B-MTE | 9 | 38.5 | 60 | 10 |
|  | SL-MF1 | 28 | B-FTM | 42 |  |  |  |
|  |  |  | B-GTM | 8 |  |  |  |
|  |  |  | B-TBT | 5 |  |  |  |
|  |  |  | B-TMB | 3 |  |  |  |
| AB-3 | SL-MF1 | 20 | B-GTM | 10 | 36.6 | 80 | 6 |
|  | SL-M | 6 | B-FTM | 46 |  |  |  |
|  | SL-MSO | 5 | B-TPT | 3 |  |  |  |
|  | SR-MF1 | 5 | B-TMB | 5 |  |  |  |
| AB-4 | SL-MF2 | 30 | B-CPDM | 12 | 39.0 | 25 | 24 |
|  | SR-MF2 | 5 | B-FEM | 3 |  |  |  |
|  |  |  | B-FTM | 42 |  |  |  |
|  |  |  | B-TBZ | 5 |  |  |  |
|  |  |  | B-TMB | 3 |  |  |  |
| AB-5 | SL-MF2 | 25 | B-MTE | 3 | 34.0 | 20 | 48 |
|  | HR-PE | 10 | B-DMDM | 4 |  |  |  |
|  |  |  | B-GTM | 12 |  |  |  |
|  |  |  | B-FTM | 40 |  |  |  |
|  |  |  | B-TBT | 3 |  |  |  |
|  |  |  | B-TMB | 3 |  |  |  |
| AB-6 | SL-MF2 | 20 | B-FTM | 40 | 29.0 | 20 | 48 |
|  | SR-MD | 2 | B-CPDM | 8 |  |  |  |
|  | HR-AC | 20 | B-TBZ | 4 |  |  |  |
|  |  |  | B-ASB | 1 |  |  |  |
|  |  |  | B-TMB | 5 |  |  |  |
| AB-7 | SL-MF3 | 45 | B-FTM | 33 | 39.5 | 20 | 48 |
|  |  |  | B-THE | 8 |  |  |  |
|  |  |  | B-AUE | 12 |  |  |  |
|  |  |  | B-TMB | 2 |  |  |  |
| AB-8 | SL-MF3 | 30 | B-FTM | 30 | 38.3 | 20 | 48 |
|  | SR-MF1 | 10 | B-FTE | 15 |  |  |  |
|  |  |  | B-APE | 10 |  |  |  |
|  |  |  | B-TMB | 5 |  |  |  |
| AB-9 | SL-MF3 | 40 | B-FTM | 30 | 39.7 | 20 | 48 |
|  |  |  | B-THE | 15 |  |  |  |
|  |  |  | B-CPDM | 15 |  |  |  |
| AB-10 | SL-MF2 | 30 | B-CPDM | 20 | 38.9 | 20 | 48 |
|  | SL-MF3 | 10 | B-FTM | 30 |  |  |  |
|  |  |  | B-AUE | 10 |  |  |  |
| AB-11 (Comparative Ex.) | SL-MF2 | 65 | B-MTE | 3 | 47.3 | 60 | 10 |
|  |  |  | B-MTM | 5 |  |  |  |
|  |  |  | B-FTM | 20 |  |  |  |
|  |  |  | B-TBT | 2 |  |  |  |
|  |  |  | B-TMB | 5 |  |  |  |
| AB-12 (Comparative Ex.) | SL-MF3 | 10 | B-FTM | 30 | 21.7 | 20 | 48 |
|  | HR-AC | 30 | B-GTM | 25 |  |  |  |
|  |  |  | B-ASB | 5 |  |  |  |

5) Metal-containing organic compounds for the curing catalyst (B), blocking agents, and reaction retardants used in this Example (each selected from commercially available products) are shown in Table 5. Additionally, contents of metal elements in the metal-containing organic compounds are also shown in terms of $MO_{y/2}$ (wt %).

TABLE 5

| Chemical name of curing catalyst | $MO_{y/2}$ (wt %) | Symbol |
|---|---|---|
| Zinc naphthenate | 32.5 | C-Zn |
| Cobalt octate | 21.7 | C-Co |
| Aluminum tri-n-butoxide | 41.6 | C-BA1 |
| Tris(acetylacetonato)aluminum | 37.0 | C-AA1 |
| Dibutyltin dilaurate | 23.9 | C-SnB |
| Dibutyltindiacetate | 42.9 | C-SnA |
| Chemical name of blocking agent | $MO_{y/2}$ | Symbol |
| Ethyl acetoacetate | 0 | CB-AAE |
| Malonic acid diester | 0 | CB-ME |
| Benzoylacetone | 0 | CB-BA |
| Ethyl trifluoroacetate | 0 | CB-FAE |
| Chemical name of retardant | $MO_{y/2}$ | Symbol |
| Methyl alcohol | 0 | CD-MA |
| Isobutanol | 0 | CD-IB |
| Ethyleneglycol | 0 | CD-EG |
| Glycerin | 0 | CD-GL |

6) Formulations of complex curing catalyst (C) wherein the metal-containing organic compound, blocking agent and reaction retardant are combined are given in Table 6.

TABLE 6

| Sample No. | Metal-containing Organic Compound Kind | wt % | Blocking Agent Kind | wt % | Reaction Retardant Kind | wt % | $MO_{y/2}$ (%) |
|---|---|---|---|---|---|---|---|
| C-1 | C-Zn | 50 | CB-AAE | 50 | — | — | 16.2 |
| C-2 | C-Co | 50 | CB-AAE | 50 | — | — | 10.9 |
| C-3 | C-BA1 | 50 | CB-AAE | 50 | — | — | 20.8 |
| C-4 | C-AA1 | 50 | CB-AAE | 50 | — | — | 18.5 |
| C-5 | C-SnA | 80 | CB-AAE | 20 | — | — | 34.3 |
| C-6 | C-SnB | 60 | CB-ME | 40 | — | — | 25.3 |
| C-7 | C-SnA | 60 | CB-BA | 40 | — | — | 25.7 |
| C-8 | C-SnA | 60 | CB-FAE | 40 | — | — | 25.7 |
| C-9 | C-SnB | 70 | — | — | CD-MA | 30 | 16.7 |
| C-10 | C-SnA | 80 | — | — | CD-EG | 20 | 34.3 |
| C-11 | C-SnA | 90 | — | — | CD-GL | 10 | 38.6 |
| C-12 | C-SnA | 65 | CB-AAE | 25 | CD-MA | 10 | 27.9 |
| C-13 | C-SnA | 55 | — | — | CD-IB | — | 32.9 |
|  | C-AA1 | 25 |  |  |  |  |  |

EXAMPLE 2

II Organosiloxane liquid compositions and siloxane polymer compositions 17 organosiloxane liquid compositions obtained in this Example are shown in Table 7.

For comparison, the following six comparative samples were prepared: a liquid composition containing a silicone resin h1ving OH groups (OS-AB sample symbol: AB-3) and not having been subjected to the preliminatry treatment (sample No. H-1); a binary liiqid composition containing metal elements in a content of at least 40% by weight (OS-AB sample symbol: AB-10) (sample No. H-2); a binary liquid composition containing metal elements in a content of less than 25% by weight (OS-AB sample symbol: AB-11) (sample No. H-3); a binary liquid composition (OS-AB sample symbol: AB-3) and not containing the cross-linking agent (sample No. H-4); a general-purpose, commercially available acrylic coating composition prepared from organic compounds (sample No. H-5); and a commercially available, bake-curable water-glass coating composition (sample No. H-6).

One-pack storage stability of the organosiloxane liquid compositions was examined according to the following testing method, and the siloxane compositions were cured under the curing conditions shown in Table 7. Adhesively following properties and heat resistance of the cured siloxane products were evaluated according to the following testing method. Results of the tests are also shown in Table 7. Testing methods:
One-pack storage stability A sample organosiloxane liquid composition was placed in a sealed vessel, and was left for one month at room temperature. Samples undergoing no change were rated as having "good" one-pack storage stability, whereas samples undergoing the phenomenon of gelation or skinning were rated as having "bad" one-pack storage stability.

Heat resistance

Heat resistance was determined according to the general test described in JIS K 5400. That is, each sample composition was coated on a 0.4-mm thick steel plate described in JIS G 3141 by a spray-coating method in a thickness of about 30 microns, then cured under the curing conditions shown in Table 7. The resulting test samples were placed in a 250° C. electrical furnace for 24 hours, then taken out of the furnace. Test samples suffering no abnormality such as cracks and change in color were scored as having "good" heat resistance, and samples suffering the abnormality were scored as having "bad" heat resistance.

Adhesively following properties

Test samples prepared in the test on heat resistance which comprise a 0.4-mm thick steel plate having formed thereon the cured coating were used. These test samples were mounted on a flexing machine described in JIS K 5400 6.16 and flexed around a 4 mmo shaft. Samples suffering no cracks and no peeling were rated as having "good" adhesively following properties, and samples suffering some abnormality were rated as having "bad" adhesively following properties.

TABLE 7

| Sample No. | OS-AB Liquid Composition No. | wt % | Curing Catalyst (C) No. | wt % | One-pack Storage Stability | Curing Conditions °C. × h | Heat Resistance | Adhesively Following Properties |
|---|---|---|---|---|---|---|---|---|
| S-1 | AB-1 | 95 | C-12 | 5 | good | 25 × 120 | good | good |
| S-2 | AB-3 | 95 | C-12 | 5 | good | 25 × 120 | good | good |
| S-3 | AB-4 | 98 | C-5 | 2 | good | 180 × 0.06 | good | good |
| S-4 | AB-5 | 97 | C-6 | 3 | good | 25 × 120 | good | good |
| S-5 | AB-6 | 98 | C-11 | 2 | good | 180 × 0.17 | good | good |
| S-6 | AB-1 | 90 | C-1 | 10 | good | 150 × 0.30 | good | good |
| S-7 | AB-2 | 90 | C-2 | 10 | good | 150 × 0.30 | good | good |
| S-8 | AB-2 | 90 | C-3 | 10 | good | 150 × 0.30 | good | good |
| S-9 | AB-2 | 90 | C-4 | 10 | good | 150 × 0.30 | good | good |
| S-10 | AB-7 | 95 | C-7 | 5 | good | 200 × 0.10 | good | good |
| S-11 | AB-7 | 95 | C-8 | 5 | good | 200 × 0.10 | good | good |
| S-12 | AB-7 | 95 | C-9 | 5 | good | 200 × 0.10 | good | good |
| S-13 | AB-7 | 92 | C-13 | 8 | good | 25 × 120 | good | good |
| S-14 | AB-8 | 92 | C-13 | 8 | good | 25 × 120 | good | good |
| S-15 | AB-9 | 92 | C-13 | 8 | good | 25 × 120 | good | good |
| S-16 | AB-8 | 92 | C-12 | 8 | good | 150 × 0.20 | good | good |
| S-17 | AB-10 | 92 | C-12 | 8 | good | 60 × 1 | good | good |
| H-1 | AB-3 | 95 | C-5 | 5 | bad | — | — | — |
| H-2 | AB-11 | 95 | C-5 | 5 | good | 25 × 168 | good | bad |
| H-3 | AB-12 | 95 | C-5 | 5 | good | 25 × 168 | bad | good |
| H-4 | no cross-linking agent | — | — | — | good | 25 × 168 | bad | bad |
| H-5 | Acrylic composition | — | — | — | good | 25 × 168 | bad | good |
| H-6 | Water glass composition | — | — | — | bad | 35 × 0.5 | bad | bad |

It can be seen, from the above-described results, that a solvent-free liquid composition prepared from the organosiloxane liquid composition of the present invention and having a total metal content of from 25% by weight to less than 40% by weight in terms of $MO_{y/2}$ can form a cured siloxane polymer composition having good heat resistance and good adhesive properties. On the other hand, liquid compositions not having been subjected to the preliminary treatment had poor one-pack storage stability and gelled in one week. Cured siloxane polymer composition formed from liquid compositions having the total metal content of 40% by weight or more in terms of $MO_{y/2}$ suffered cracking of the coating by flexing around a 3-mm$\phi$ shaft, thus lacking adhesively following properties, whereas cured siloxane polymer composition formed from liquid compositions having the total metal content of less than 25% by weight had no heat resistance. Liquid compositions not containing the cross-linking agent were not cured at all even when allowed to stand for a long time (one week) at an ordinary temperature, thus failing to form a film. Cured products from the organic resin type coating compositions had absolutely no heat resistance, whereas cured products from the water-glass composition showed no adhesively following properties.

EXAMPLE 3

III Application as a shaped polymer composition

According to this application, a liquid composition selected from the organosiloxane liquid compositions (OS liquid compositions) shown in Table 7 was independently kept in a shape of film or filament to produce a siloxane cured product. Application as a thin film:

A liquid composition selected from the OS liquid compositions shown in Table 7 was cast in a thickness of about 25 microns on a plasticizer-containing, soft polyvinyl chloride plate, was allowed to stand for 72 hours at an ordinary temperature to form a thin film sample.
Application as a filament:

A liquid composition selected from the OS liquid compositions shown in Table 7 was cast in a thickness of about 10 microns on the surface of water, and was allowed to stand for one hour at an ordinary temperature to permit partial polymerization, and the cast composition having an increased viscosity was taken upward to form a filament of about 0.1 mm$\phi$ in thickness. This filament was then passed through a heating station kept at about 200° C. to form a cured filament sample.

The thus obtained thin film sample and the filament sample were subjected to the following heat resistance test and flexibility test. The thus obtained results are also shown in Table 8.

Testing method:
(1) Heat resistance

Each sample was placed in a 250° C. electrical furnace for 24 hours, then taken out of the furnace. Test samples suffering no abnormality such as contraction, breakage, melting and change in color were scored as having "good" heat resistance, and samples suffering the abnormality were scored as having "bad" heat resistance.

(2) Flexibility

Each sample was wound around a 3-mm$\phi$ shaft. Samples not suffering tear or breakage and showing no abnormality when unwound were scored as having "good" flexibility, and samples suffering the abnormality were scored as having "bad" flexibility.

TABLE 8

| Sample No. | OS Composition | Thin Film | | Filament | |
|---|---|---|---|---|---|
| | | Heat Resistance | Flexibility | Heat Resistance | Flexibility |
| M-1 | S-1 | good | good | — | — |
| M-2 | S-4 | — | — | good | good |
| M-3 | S-5 | good | good | — | — |
| M-4 | S-11 | — | — | good | good |
| M-5 | S-13 | — | — | good | good |
| M-6 | S-15 | good | good | — | — |
| M-7 | S-16 | — | — | good | good |

As can be seen, from the above results, that a film or a filament formed by curing the organosiloxane composition of the present invention has good heat resistance and good flexibility.

EXAMPLE 4

IV Application as an adhesive polymer composition

According to this application, a liquid composition selected from the organosiloxane liquid compositions (OS liquid compositions) shown in Table 7 was formed into a coating composition or an adhesive binder independently or together with a filler or the like. Specific applications as an adhesive polymer composition are illustrated below. IV-1 Application as transparent film A clear liquid composition selected from the OS liquid compositions shown in Table 7 was coated on a steel plate as described in item II with respect to heat resistance test, and was cured under the conditions shown in Table 9. The resulting test samples were subjected to the following tests on surface hardness, adhesion properties, heat resistance, incombustibility, water impermeability, acid resistance, alkali resistance, deflection resistance and weatherability to examine physical properties of the siloxane polymer compositions as the adhesive polymer compositions. Results thus obtained are also shown in table 9.

Testing method:
(1) Surface hardness

The cured test sample was subjected to the pencil hardness test prescribed in JIS K 5400, 6.14. The results thus obtained are also shown in terms of pencil hardness.

(2) Adhesion properties

6×6 cuts were made crosswise in the coat film of each sample with an interval of 1.0 mm using a cutter knife to form a grid pattern prescribed in JIS K 5400, 6.15. Then, an adhesive cellophane tape was applied to the grid pattern area, followed by peeling the tape. Samples suffering no peeling or no flaws were scored as 25/25. Samples suffering peeling or flaws were scored by subtracting the number of peeled or flawed grid pieces from the numerator of 25.

(3) Heat resistance

Each sample was placed in a 250° C. electrical furnace for 24 hours in the same manner as described in the heat resistance test conducted in the item II, then taken out of the furnace and allowed to cool to room temperature. Samples suffering no blisters, cracks and peeling were scored as having "good" heat resistance, and samples suffering the abnormality were scored as having "bad" heat resistance.

(4) Incombustibility

Each sample was placed in a 450° C. electrical furnace into which enough oxygen was supplied. Samples showing no self-burning properties and not changing to charcoal carbon were scored as having "good" incombustibility, and samples suffering such abnormality were scored as having "bad" incombustibility.

(5) Water impermability

Each of the sample compositions was applied to Toyo filter paper No.6, and the thus-prepared test piece was applied to a funnel of gravity filtration. Water was poured into the funnel, and an amount of water passing through the sample was determined. Samples not allowing water to pass therethrough were scored as having "good" water impermeability, and samples permitting any water to pass therethrough were scored as having "bad" water impermeability.

(6) Acid resistance

Acid resistance was determined according to the coat-heating test described in JIS K 5400, 7.5. That is, each test piece prepared by coating the composition on a glass plate was dipped in a 20° C., 5 wt % sulfuric acid solution for 30 days. Samples suffering no blisters, bubbles, peeling, holes, softening and dissolution were scored as having "good" acid resistance, and samples suffering such abnormality were scored as having "bad" acid resistance.

(7) Alkali resistance (Na resistance)

About 5 cc of a 5 wt % sodium hydroxide (NaOH) solution adjusted to pH 10 was placed on each of the test piece with covering it by a watch glass to prevent vaporization of the solution. After being allowed to stand at room temperature for 24 hours, the coated surface was washed and observed. Samples undergoing no changes were scored as having "good" alkali resistance, and samples suffering abnormality such as dissolution were scored as having "bad" alkali resistance.

(8) Deflection resistance

Each sample was deflected around a round shaft of 3 mm$\phi$ using a deflection tester described in JIS K 5400, 6.16. Samples showing no abnormality were scored as having "good" resistance against deflection, and samples suffering abnormality were scored as having "bad" resistance against deflection".

(9) Weatherability (weatherometer)

Each test sample was subjected to iradiation-dropwise condensation cycle for 2500 hours at 55+15° C. using a weatherometer of model QUV (280 to 320 nm in wavelength region). Gloss of each sample was measured before and after the irradiation. Samples showing a gloss reduction (%) within 10% were scored as having "good" weatherability, and samples showing a gloss reduction (%) more than 10% were scored as having "bad" weatherability.

TABLE 9

| Sample No. | PC-1 | PC-2 | PC-3 | PC-4 | PC-5 | PC-6 | PC-7 |
|---|---|---|---|---|---|---|---|
| OS Liquid Composition | S-1 | S-4 | S-5 | S-11 | S-13 | S-15 | S-16 |
| Curing Condition | | | | | | | |
| °C. | 15 | 25 | 40 | 80 | 170 | 200 | 150 |
| Hours | 100 | 72 | 20 | 0.80 | 0.20 | 0.10 | 0.20 |
| Hardness | 2H | 2H | 2H | 3H | 3H | 3H | 3H |
| Adhesion | 25/25 | 25/25 | 25/25 | 25/25 | 25/25 | 25/25 | 25/25 |
| Heat Resistance | good | good | good | good | good | good | good |
| Incombustibility | good | good | good | good | good | good | good |
| Acid Resistance | good | good | good | good | good | good | good |
| Na Resistance | good | good | good | good | good | good | good |
| Resistance against Deflection | good | good | good | good | good | good | good |
| Weatherability | good | good | good | good | good | good | good |

It can be seen, from the above results, that, when applied to a steel plate, the solvent-free, one-pack type organosiloxane liquid composition of the present invention forms a transparent cured film as a result of moisture curing. This transparent film has some surface hardness, good heat resistance, good incombustibility, good acid resistance, good alkali resistance, good resistance against deflection and good weatherability, and is useful as a film for protecting a substrate.

IV-2 Application as a filler-containing film or binder

Fillers used in this example are shown in Table 10. Additionally, these fillers were previously subjected to drying treatment at about 200° C. before use to dehydrate them to some extent.

TABLE 10

| Sample No. | Name of Filler | Major Component | Particle Size |
|---|---|---|---|
| F-1 | Silica stone powder | $SiO_2$ | up to 44μ |
| F-2 | Calcined aluminum silicate | $Al_2O_3.SiO_2$ | up to 44μ |
| F-3 | Talc powder | $MgO.SiO_2$ | up to 44μ |
| F-4 | Fumed silica | $SiO_2$ | up to 10μ |
| F-5 | Alumina powder | $Al_2O_3$ | up to 44μ |
| F-6 | Silicon carbide powder | SiC | up to 10μ |
| F-7 | Mineral fiber powder | $Al_2O_3.SiO_2$ | up to 44μ |
| F-8 | Glass beads | $SiO_2$ | up to 80μ |
| F-9 | Silicon phosphate powder | $2SiO_2.P_2O_5$ | up to 44μ |
| F-10 | Boron phosphate powder | $B_2O_3.P_2O_5$ | up to 10μ |
| F-11 | Zinc chromate powder | $ZnO.CrO_3$ | up to 20μ |
| F-12 | Special glaze powder | $PbO.SiO_2.B_2O_3$ | up to 10μ |
| F-13 | Titanium oxide | $TiO_2$ | up to 5μ |
| F-14 | Organic red pigment | Quinacridone type | up to 5μ |
| F-15 | Aluminum powder | Al | up to 20μ |

TABLE 10-continued

| Sample No. | Name of Filler | Major Component | Particle Size |
|---|---|---|---|
| | paste | | |

A powdery filler (an activating agent, a filler, a pigment or a colorant) of up to 200μ in particle size shown in Table 10 was added to a liquid composition selected from the OS-AB compositions (formulations being shown in Table 11), then was placed in an SG mill containing aluminum balls and dispersed for about one hour.

The liquid compositions containing dispersed therein the fillers were subjected to the preliminary treatment under the conditions shown in Table 11. Curing catalysts were compounded therein (compounding formulations: shown in Table 11) to prepare coating compositions for fluid or plastic binders. Additionally, sample Nos. PE-1, PE-2 and PE-3 were applied to a blast-treated steel plate according to the spary method usng an air gun, sample No. PE-4 according to roll-coating method, and sample Nos. PE-5, PE-6 and PE-7 according to troweling method.

Each of the OS liquid compositions containing the fillers was subjected to the curing conditions shown in Table 11 to prepare coating samples or binder samples. the thus obtained samples were subjected to the tests shown in the item IV-1, i.e., tests on surface hardness, adhesion properties, heat resistance, incombustibility, water impermeability, acid resistance, alkali resistance, resistance against deflection and weatherability and to the adhesion test (10) shown below to evaluate the properties as a siloxane polymer composition. Results thus obtained are also shown in Table 11.

(10) Adhesion properties

A prepared liquid sample was cast into a 40×40×15 cm frame formed on a steel plate, and was subjected to the curing step at 25° C. for 7 days to prepare a test piece wherein the test cured product was adhered to the steel plate. Then, each test piece was adhered to an attachment of a tester with an epoxy resin adhesive according to the adhesion-testing method prescribed by the Building Research Institute of the Ministry of Construction, and was pulled upward through hydraulic power of the tester to determine the load (P) at which the adhesion between the steel plate and the solidified test piece was broken. Adhesion force was determined from the load and presented in terms of $kg/cm^2$.

TABLE 11

| Sample No. | PE-1 | PE-2 | PE-3 | PE-4 | PE-5 | PE-6 | PE-7 |
|---|---|---|---|---|---|---|---|
| OS-AB Composition (Table 4) | | | | | | | |
| Symbol | AB-10 | AB-7 | AB-8 | AB-9 | AB-3 | AB-4 | AB-5 |
| Parts by Weight | 100 | 100 | 100 | 100 | 100 | 100 | 100 |
| Filler (parts by weight) | | | | | | | |
| F-1 | — | — | — | — | — | 20 | — |
| F-2 | 10 | — | 5 | 5 | 30 | 30 | 30 |
| F-3 | — | — | 5 | — | 2 | 3 | 3 |
| F-4 | — | — | — | — | 3 | 5 | 5 |
| F-5 | — | — | 20 | — | 20 | — | — |
| F-6 | — | — | 20 | — | — | — | — |
| F-7 | — | — | — | — | — | 10 | 10 |
| F-8 | — | — | — | — | 250 | 100 | 100 |
| F-10 | — | — | 5 | 10 | — | — | — |
| F-11 | — | — | — | 10 | 10 | — | — |
| F-12 | — | — | 20 | — | — | — | — |
| F-13 | — | 30 | 5 | 20 | 20 | — | 10 |
| F-14 | 15 | — | — | — | — | — | — |
| F-15 | — | — | 15 | — | — | — | — |
| Conditions of preliminary step, °C · h | 25 × 24 | 60 × 3 | 25 × 24 | 30 × 12 | 15 × 48 | 80 × 1 | 25 × 24 |
| Curing agent | | | | | | | |
| Kind | C-13 | C-12 | C-11 | C-13 | C-13 | C-13 | C-13 |
| Parts by weight | 10 | 5 | 5 | 10 | 10 | 10 | 10 |
| Curing temp. °C. | 22 | 200 | 150 | 30 | 25 | 25 | 25 |
| Curing time H | 120 | 0.05 | 0.3 | 120 | 120 | 120 | 120 |
| Test results | | | | | | | |
| Hardness | 3H | 4H | 4H | 3H | 4H | 4H | 4H |
| Adhesion | good | good | good | good | good | good | good |
| Heat resistance | good | good | good | good | good | good | good |
| Incombustibility | good | good | good | good | good | good | good |
| Acid resistance | good | good | good | good | good | good | good |
| Na resistance | good | good | good | good | good | good | good |
| Deflection resistance | good | good | good | good | good | good | good |
| Weatherability | good | good | good | good | good | good | good |
| Adhesion property | 22 | 28 | 30 | 30 | 35 | 40 | 40 |
| Main uses | *1 | *2 | *3 | *4 | *5 | *6 | *7 |

*1 Enamel, etc. dried at ordinary temperature
*2 Coating composition, coating material, etc. dried by heating
*3 Heat-resistant coating material, etc. dried by heating
*4 Rust proof coating material, etc. dried at ordinary temperature
*5 Flooring, building material, etc.
*6 Binder, etc.
*7 Anchorage material, etc.

It can be seen, from the above results, that the solvent-free, one-pack type organosiloxane liquid composition of the present invention can form a coating material or a binder of a siloxane polymer cured product which has high surface hardness, good heat resistance, good incombustibility, high acid and alkali resistance, good resistance against deflection, good weatherability and good adhesion properties.

EXAMPLE 5

V Application as a composite structure

Reinforcing agents, aggregates, moldings, etc. used in this Example are shown in Table 12. Additionally, these materials were previously subjected to drying treatment at about 200° C. before use to enough dehydrate.

TABLE 12

| Sample No. | Name of Material | Major Component | Size |
|---|---|---|---|
| M-1 | Sandy silica stone | SiO$_2$ | 220–2,000μ |
| M-2 | Sandy alumina | Al$_2$O$_3$ | 220–2,000μ |
| M-3 | Sandy silicon carbide | SiC | 220–2,000μ |
| M-4 | Artificial aggregate particles | SiO$_2$ Al$_2$O$_3$ | 500–2,000μ |
| M-5 | Fibrous metal | stainless steel | 0.3 × 12 mm |
| M-6 | Wire gauze | iron | 0.3 mmφ with |
| M-7 | Net | nylon | 5-mm space 0.2 mmφ with 2-mm space |
| M-8 | Massive industrial waste | Na$_2$SO$_4$ | 2 cmφ × 1.5 cm |

Materials (reinforcing agents, aggregates and moldings) of at least 200μ in size shown in Table 12 were mixed with the mixed OS liquid composition containing dispersed therein powdery fillers (activating agents, fillers, pigments and colorants)(PE series shown in Table 11) to prepare composite compositions. These composite compositions were subjected to the curing conditions shown in Table 13 to prepare samples of the composite structure. These samples were subjected to the following tests on heat resistance, incombustibility, weatherability and compression strength to evaluate the properties thereof.

Testing method:
(1) Heat resistance; (2) Incombustibility; and (3) Weatherability:

The same as with the test of transparent film.
(4) Compression strength:

Each of the composite structure compositions was prepared in a rectangular frame (2×2×8 cm) according to JIS A 1108 and, after leaving for 7 days at room temperature, the frame was removed, followed by determining compression strength (kg/cm$^2$) according to JIS A 1132 using a compression tester.

TABLE 13

| Sample No. | N-1 | N-2 | N-3 | N-4 | N-5 |
|---|---|---|---|---|---|
| OS composition (Table 11) | | | | | |
| No. | PE-4 | PE-2 | PE-2 | PE-3 | PE-1 |
| Parts by weight | 100 | 100 | 100 | 100 | 100 |
| Materials and amounts thereof (parts by weight) | | | | | |
| M-1 | 40 | — | — | — | — |
| M-2 | — | 100 | — | — | — |
| M-3 | — | 200 | — | — | — |
| M-4 | 100 | 100 | — | — | — |
| M-5 | 100 | — | — | — | — |
| M-6 | — | — | 1000 | — | — |
| M-7 | — | — | — | 100 | — |
| M-8 | — | — | — | — | 400 |
| Application manner | * | * | ** | ** | ** |
| Curing temp. °C. | 20 | 80 | 100 | 25 | 20 |
| Test results | | | | | |
| Heat resistance | good | good | good | good | good |
| Incombustibility- | good | good | good | good | good |
| Weatherability | good | good | good | good | good |
| Compression | 250 | 300 | 300 | 135 | — |
| Main uses | *1 | *2 | *3 | *4 | *5 |

Mixing;
**Casting
***Dipping
*1 Thick flooring, etc.
*2 Heat-resistant flooring, etc.
*3 Building materials or like structures, etc.
*4 Building materials or like structures, etc.
*5 Treatment of wastes, etc.

It can be seen, from the above-results, that various reinforcing materials, aggregates, moldings, etc. can be unified with the mixed composition of the solvent-free organosiloxane liquid composition and exposed to moisture to form a composite structure such as flooring and building structure or to treat wastes wherein the cured siloxane polymer functions as a binder.

EXAMPLE 6

VI Application as a sheet

A commercially available, incombustible glass fiber texture (sample No. R-1) and a 325-mesh flexible metal gauze made of stainless steel fibers (sample No. R-2) were selected as the sheet bases. Each of these sheet bases was impregnated with the mixed OS liquid composition (PE series; shown in Table 11) containing dispersed therein powdery fillers (an activating agent, a filler, a pigment or a colorant) to prepare composite sheet compositions. The sheet compositions were then subjected to the curing conditions shown in Table 14 to prepare composite sheet samples of siloxane cured products. These were subjected to the same tests as employed with respect to shaped polymer compositions and composite structures on flexibility, heat resistance, incombustibility and weatherability to examine the properties of the composite sheets. Results thus obtained are also shown in Table 14.

TABLE 14

| Sample No. | RS-1 | RS-2 | RS-3 | RS-4 |
|---|---|---|---|---|
| Sheet Base | R-1 | | R-2 | |
| OS Liquid Composition | PE-1 | PE-4 | PE-1 | PE-4 |
| Curing temperature (°C.) | 25 | 80 | 22 | 150 |
| Curing time (H) | 96 | 0.4 | 96 | 0.3 |
| Test results | | | | |
| Flexibility | good | good | good | good |
| Heat resistance | good | good | good | good |
| Incombustibility | good | good | good | good |
| Weatherability | good | good | good | good |

It can be seen, from the above-results, that a sheet base impregnated with a mixture of the solvent-free, one-pack type organosiloxane liquid composition and the fillers can be unified into a composite sheet, and that this composite sheet has excellent flexibility, high heat resistance, good incombustibility and good weatherability.

Example 7

VII Application as a building material

A commercially available asbestos plate (sample No. U-1), a building material base made of dense concrete material and reinforced with glass fibers (sample No. U-2) and an iron-made outer wall (sample No. U-3) were selected as base substrates. Mixed OS liquid composition containing dispersed therein powdery fillers (activating agents, fillers, pigments and colorants)(PE series; shown in Table 11) were spray-coated on these substrates, and were subjected to the curing conditions shown in Table 15 to prepare building material samples. The samples were subjected to the same tests as employed with respect to the composite structures to examine surface hardness, luster, heat resistance, incombustibility and weatherability. Results thus obtained are also shown in Table 15.

TABLE 15

| Sample No. | UM-1 | UM-2 | UM-3 | UM-4 | UM-5 | UM-6 |
|---|---|---|---|---|---|---|
| Sheet Base | U-1 | | U-2 | | U-3 | |
| OS Liquid Composition | PE-1 | PE-4 | PE-1 | PE-4 | PE-1 | PE-4 |
| Curing temperature (°C.) | 25 | 80 | 22 | 150 | 25 | 200 |
| Curing time (H) | 96 | 0.4 | 96 | 0.3 | 96 | 0.03 |
| Test results | | | | | | |
| Surface hardness | 3H | 4H | 3H | 4H | 3H | 4H |
| Luster | 85 | 82 | 88 | 86 | 90 | 88 |
| Heat resistance | good | good | good | good | good | good |
| Incombustibility | good | good | good | good | good | good |
| Weatherability | good | good | good | good | good | good |

It can be seen, from the above results, that building materials obtained by applying the enamel coating composition composed of the solvent-free, one-pack type mixed liquid composition of the organosiloxane liquid composition and the filler to a buiding material base can form, after moisture curing, a building material having a coating of the cured siloxane layer, and that the resulting buildng materials have good heat resistance, good incombustibility, good surface luster and good weatherability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A solvent-free ternary organosiloxane composition, which contains (A) a liquid organopolysiloxane, (B) a cross-linking agent, and (C) a curing catalyst, wherein:

the liquid organopolysiloxane comprises one or more compounds of the formula

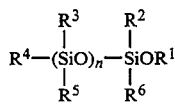

wherein $R^1$ represents a hydrogen atom or a $C_1$ to $C_5$ alkyl group, $R^2$ represents a hydrogen atom, $OR^1$ or a monovalent hydrocarbyl group, $R^3$ to $R^6$, which may be the same or different, each represents a hydrogen atom, $OR^1$ or a monovalent hydrocarbyl group and n represents a number smaller than 15, and which has a silicon content of 50% by weight or more calculated as $SiO_2$;

the cross-linking agent (B) is at least one organometallic compound of the formulas

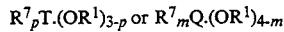

wherein T represents aluminum or boron, Q represents silicon, titanium or zirconium, $R^1$ represents a hydrogen atom or a $C_1$–$C_5$ alkyl group, $R^7$ represents a hydrogen atom, $OR^1$ or a monovalent hydrocarbyl group, p represents an integer of 0, 1 or 2, and m represents an integer of 0, 1, 2, or 3; and the curing catalyst (C) is an organometallic compound wherein the metal is zinc, cobalt, aluminum or tin;

and wherein the total weight of boron, titanium, zirconium zinc, cobalt, aluminum and tin, calculated as their oxides, is from 25% to less than 40% by weight of the composition.

2. The solvent-free ternary organosiloxane composition as described in claim 1, which contains up to 70% by weight of the cross-linking agent (B) based on the weight of the liquid organopolysiloxane (A).

3. The solvent-free ternary organosiloxane composition as described in claim 1, wherein the liquid organopolysiloxane (A), the cross-linking agent (B) or a mixture thereof contains up to 70% by weight of a solid silicone resin dissolved therein.

4. The solvent-free ternary organosiloxane composition as described in claim 1, wherein the liquid organopolysiloxane (A), the cross-linking agent (B) or a mixture thereof contains up to 30% by weight of a thermoplastic resin dissolved therein.

5. The solvent-free ternary organosiloxane composition as described in claim 1, wherein the liquid organopolysiloxane (A), the cross-linking agent (B) or a mixture thereof contains 1 to 500 parts by weight of one or more members selected from the group consisting of fillers, an adhesion-improving agent, pigments and colorants per 100 parts by weight of the liquid organopolysiloxane (A), the cross-linking agent (B) or a mixture thereof.

6. The solvent-free ternary organosiloxane composition as described in claim 5, wherein the adhesion-improving agent is a powder consisting of at least one boric acid-containing, chromic acid-containing or phosphoric acid-containing compound.

7. The solvent-free ternary organosiloxane composition as described in claim 1, wherein the composition contains up to 10% by weight of the curing catalyst (C) based the weight of the liquid organopolysiloxane (A).

8. The solvent-free ternary organosiloxane composition as described in claim 1, wherein the organometallic compound in the curing catalyst (C) is a zinc, cobalt, aluminum or tin chelate of an alkyl- or trifluoro group-containing $\beta$-keto-acid ester, a $\beta$-diketone or a malonic ester.

9. The solvent-free ternary organosiloxane composition as described in claim 1, wherein the curing catalyst (C) contains up to 50% by weight of a monohydric or polyhydric alcohol.

10. The solvent-free ternary organosiloxane composition as described in claim 1, wherein the liquid organopolysiloxane (A), the cross-linking agent (B) or a mixture thereof have been heated to a temperature of up to 100° C. prior to combining with the curing catalyst (C).

11. A shaped siloxane product formed by curing the solvent-free organosiloxane composition described in claim 1 with water or by heating the composition at a temperature up to 300° C.

12. A siloxane coating or binder formed by curing the solvent-free organosiloxane composition described in claim 1 with water or by heating the composition to 300° C.

13. A composite structure formed by contacting a mixture of 100 parts by weight of the solvent-free organosiloxane composition described in claim 1 with 1 to 2,000 parts by weight a reinforcing materials with water or by heating the mixture to 300° C.

14. A composite sheet formed by impregnating a cloth with the solvent-free organosiloxane composition described in claim 1, and contacting the impregnated cloth with water or heating the cloth at a temperature of up to 300° C.

15. A building material formed by coating the solvent-free organosiloxane composition described in claim 1 onto a plate-shaped building material and contacting the coated building material with water or heating the coated building material at a temperature of up to 300° C.

* * * * *